April 20, 1954   T. C. MANN ET AL   2,675,837
BOARD REPAIRING MACHINE
Filed Jan. 21, 1950   15 Sheets-Sheet 2
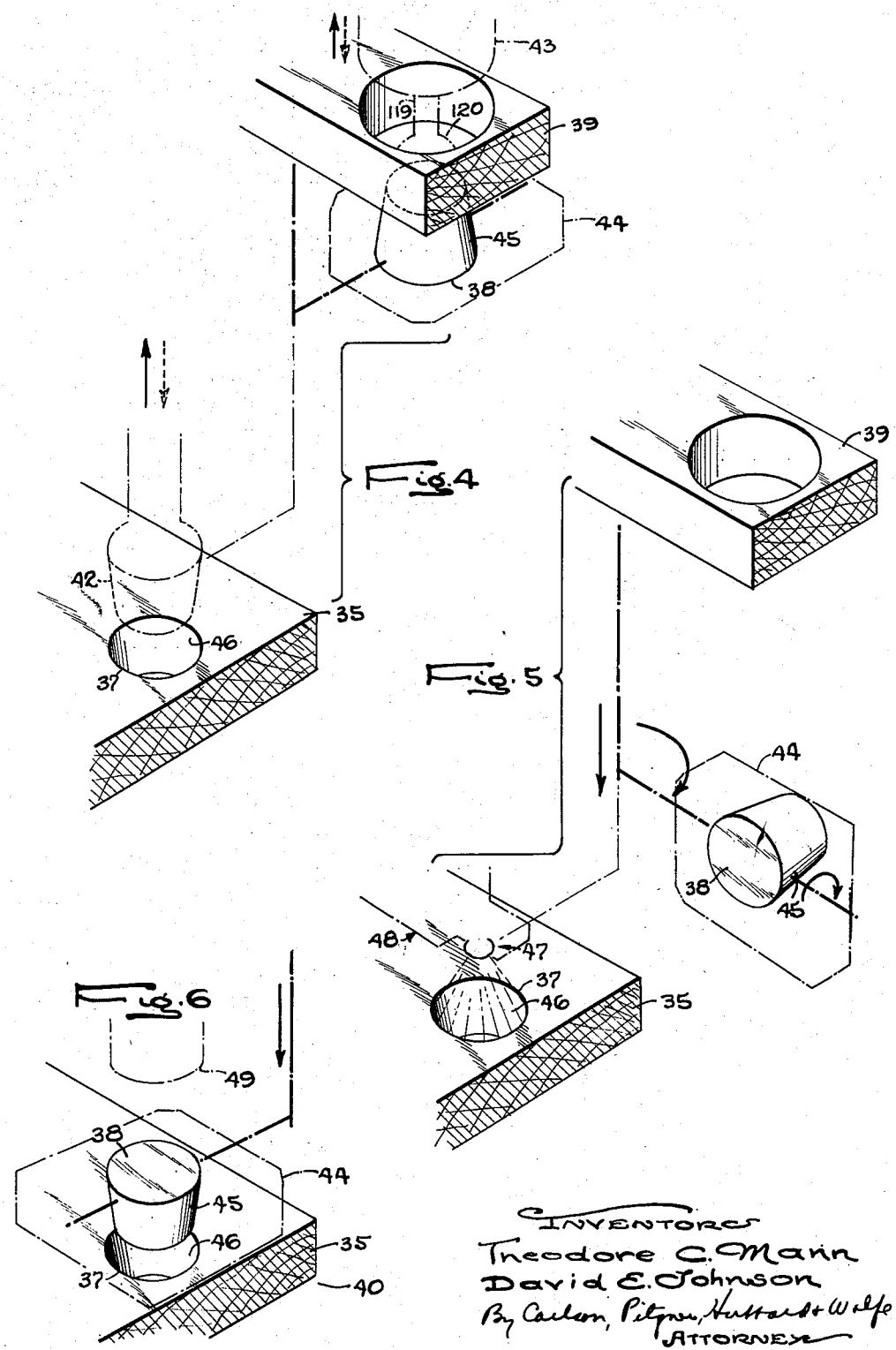

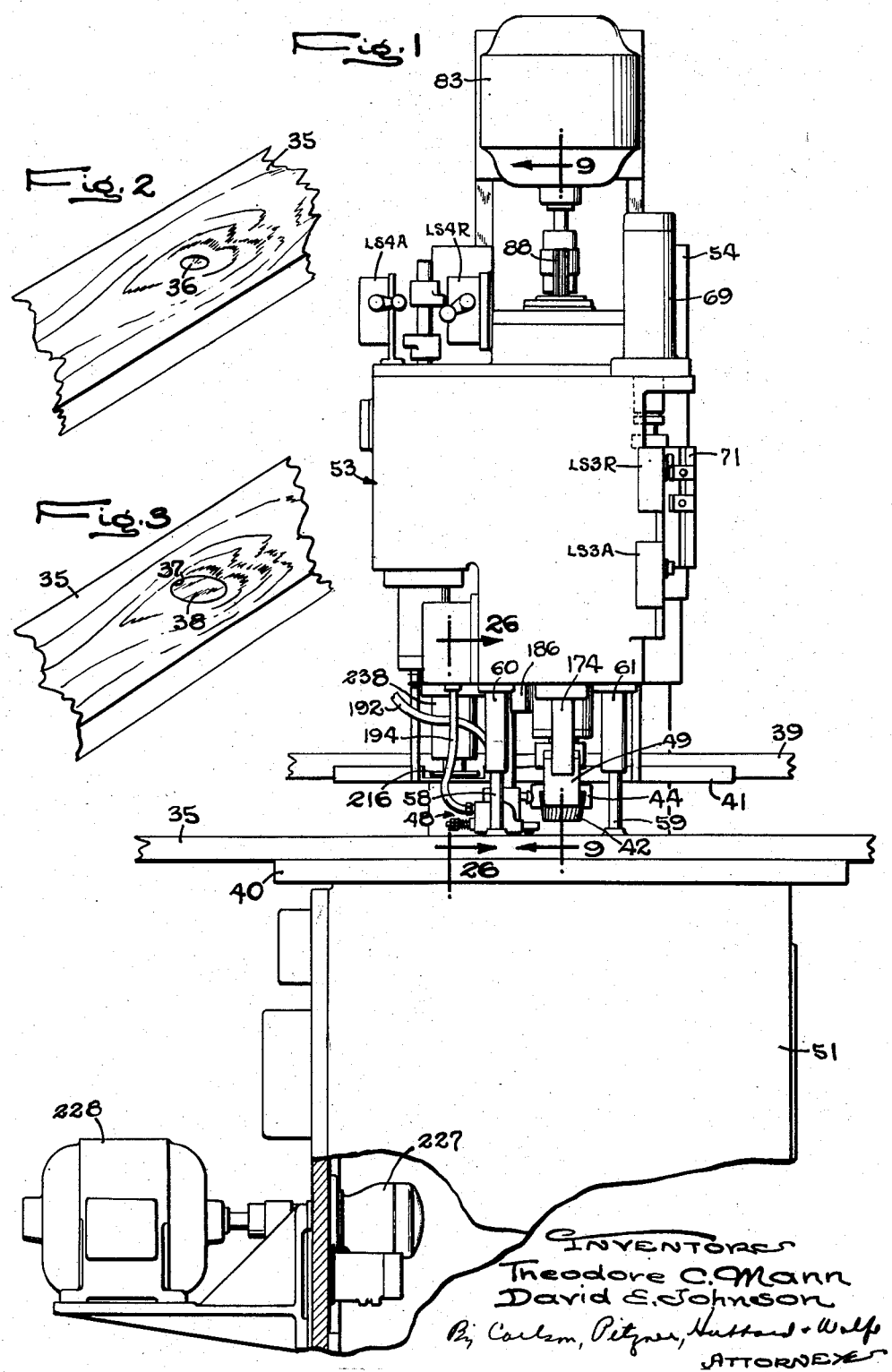

April 20, 1954  T. C. MANN ET AL  2,675,837
BOARD REPAIRING MACHINE
Filed Jan. 21, 1950  15 Sheets-Sheet 3
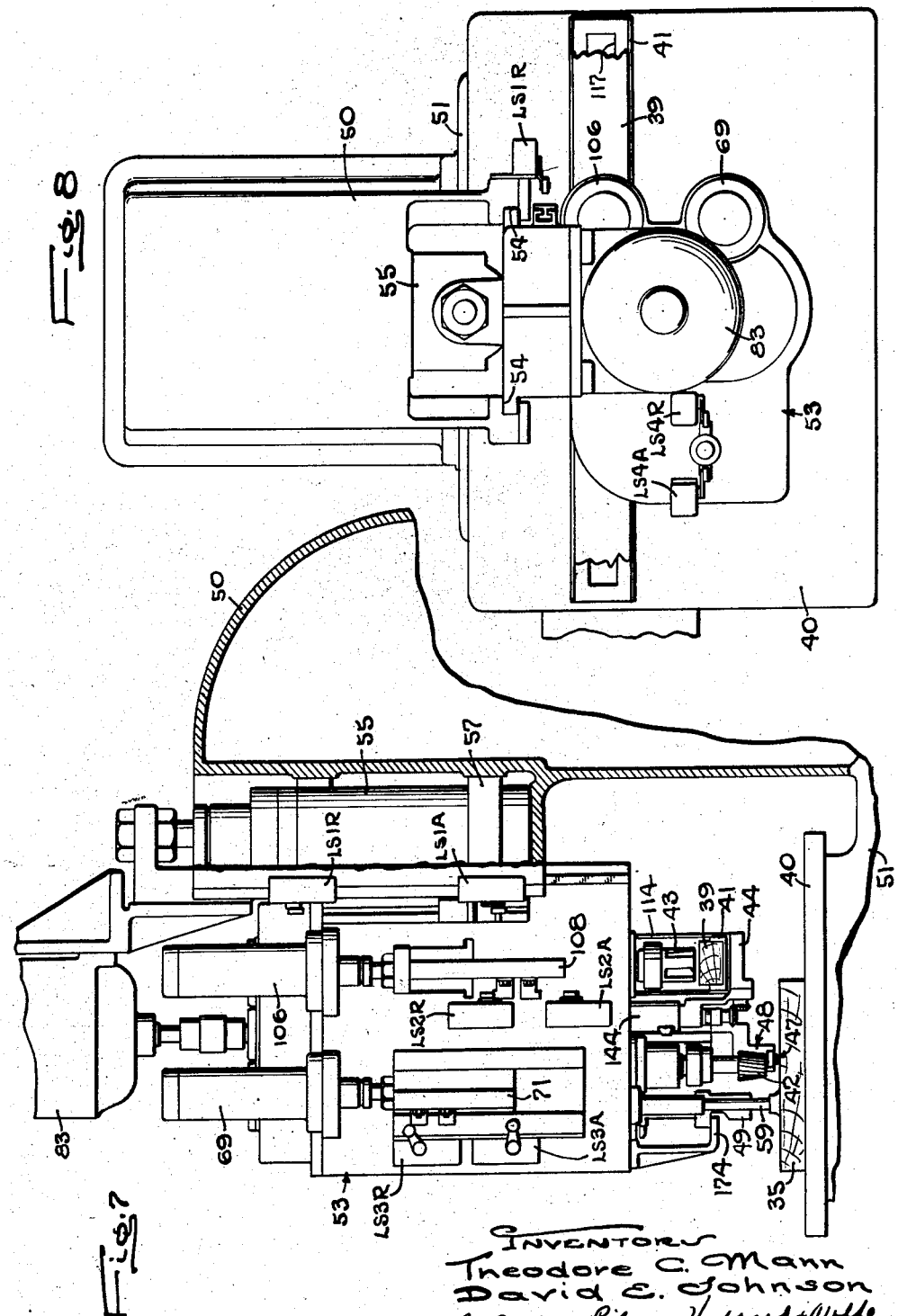

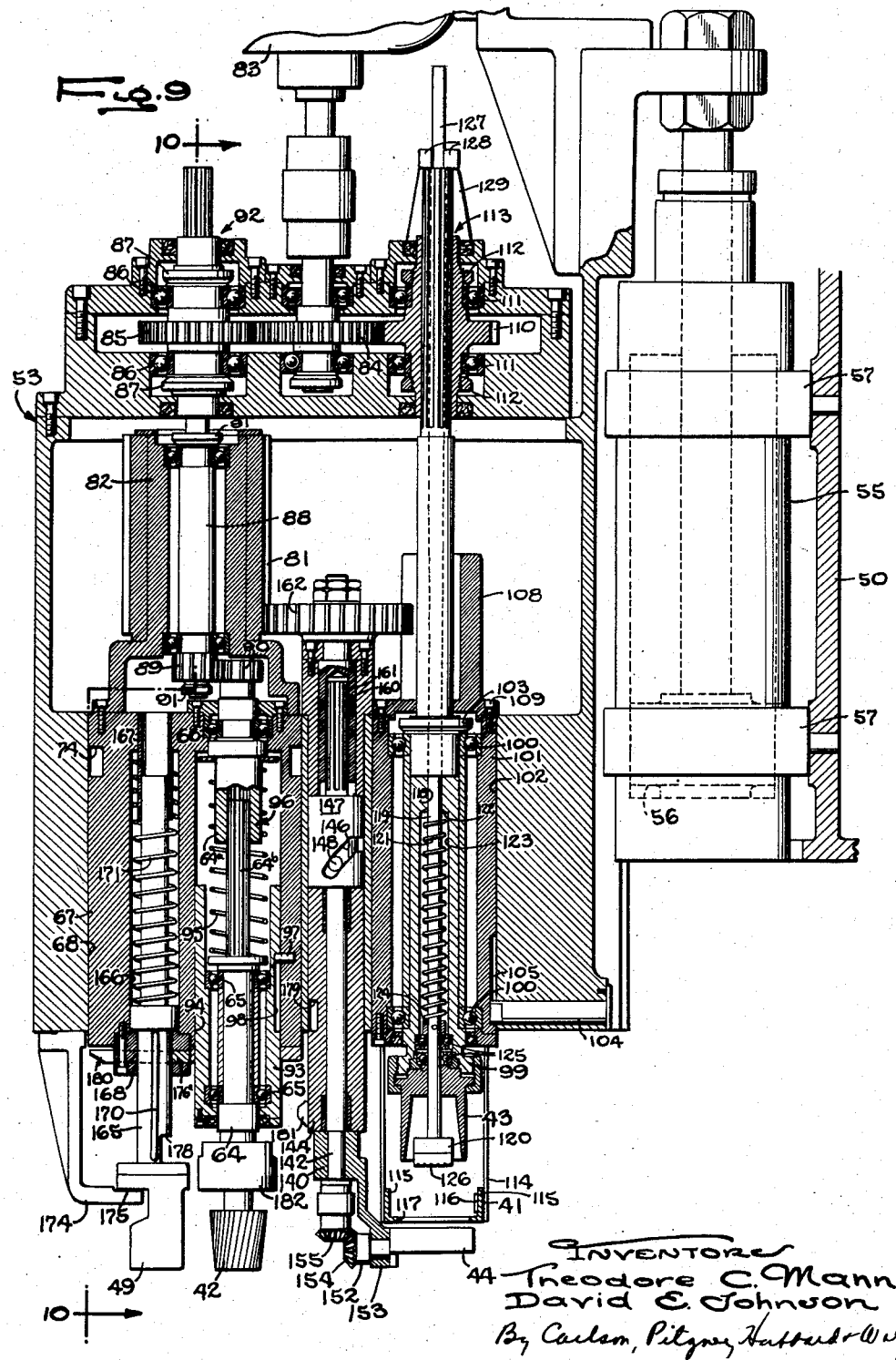

April 20, 1954
T. C. MANN ET AL
2,675,837
BOARD REPAIRING MACHINE
Filed Jan. 21, 1950
15 Sheets-Sheet 5
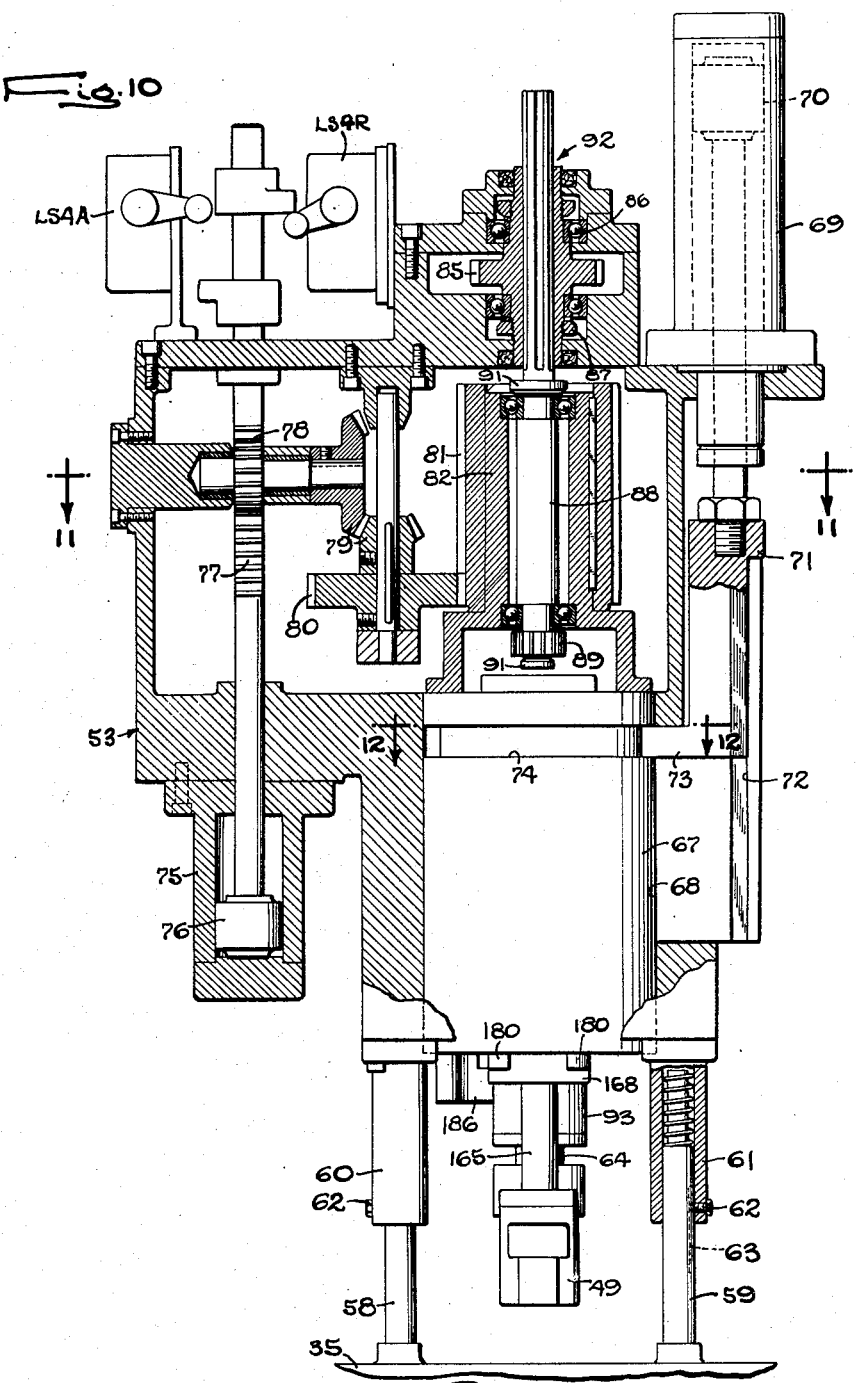

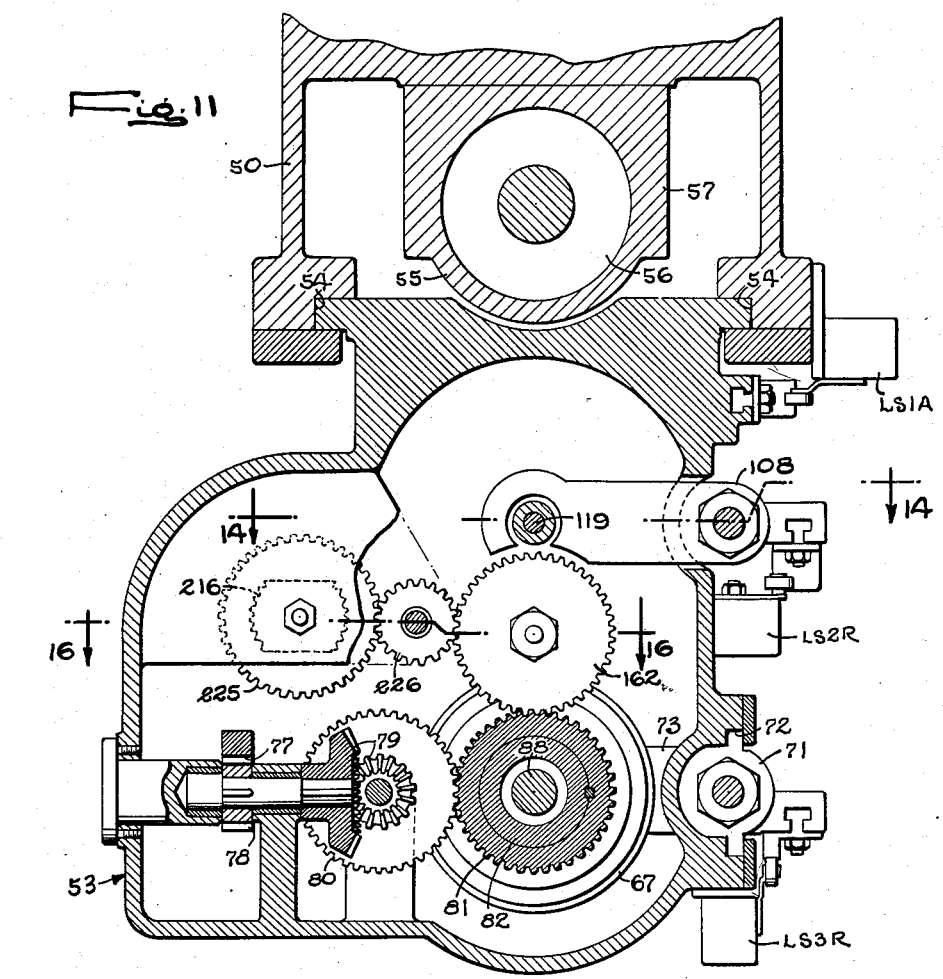
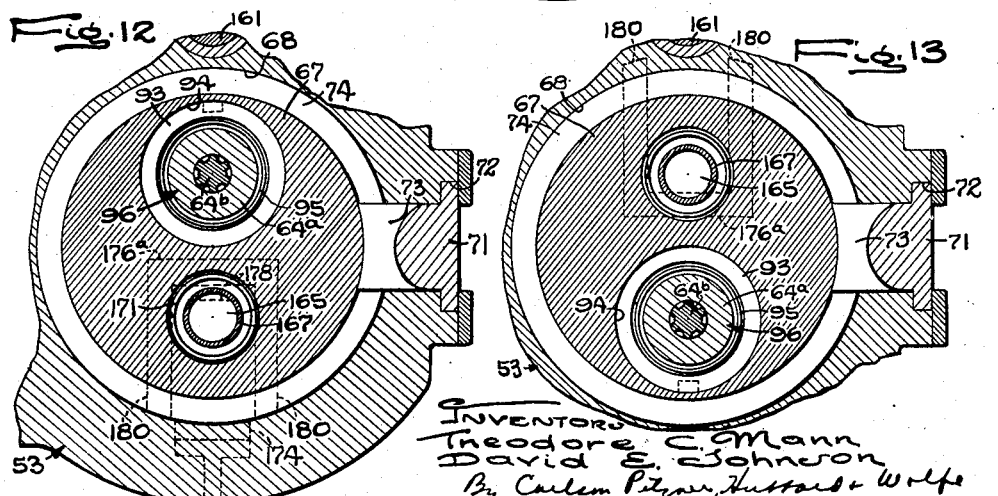

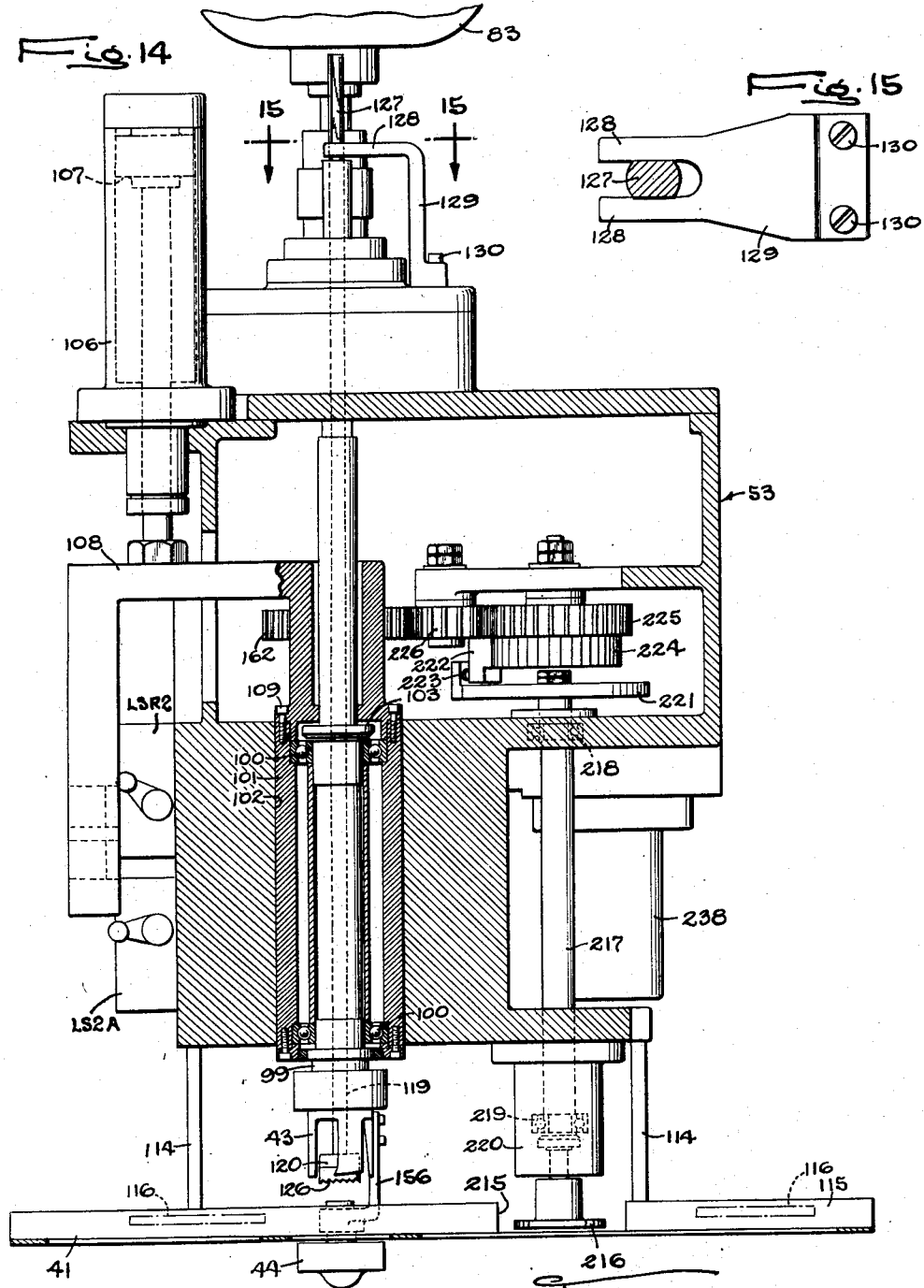

April 20, 1954 T. C. MANN ET AL 2,675,837
BOARD REPAIRING MACHINE
Filed Jan. 21, 1950 15 Sheets-Sheet 8
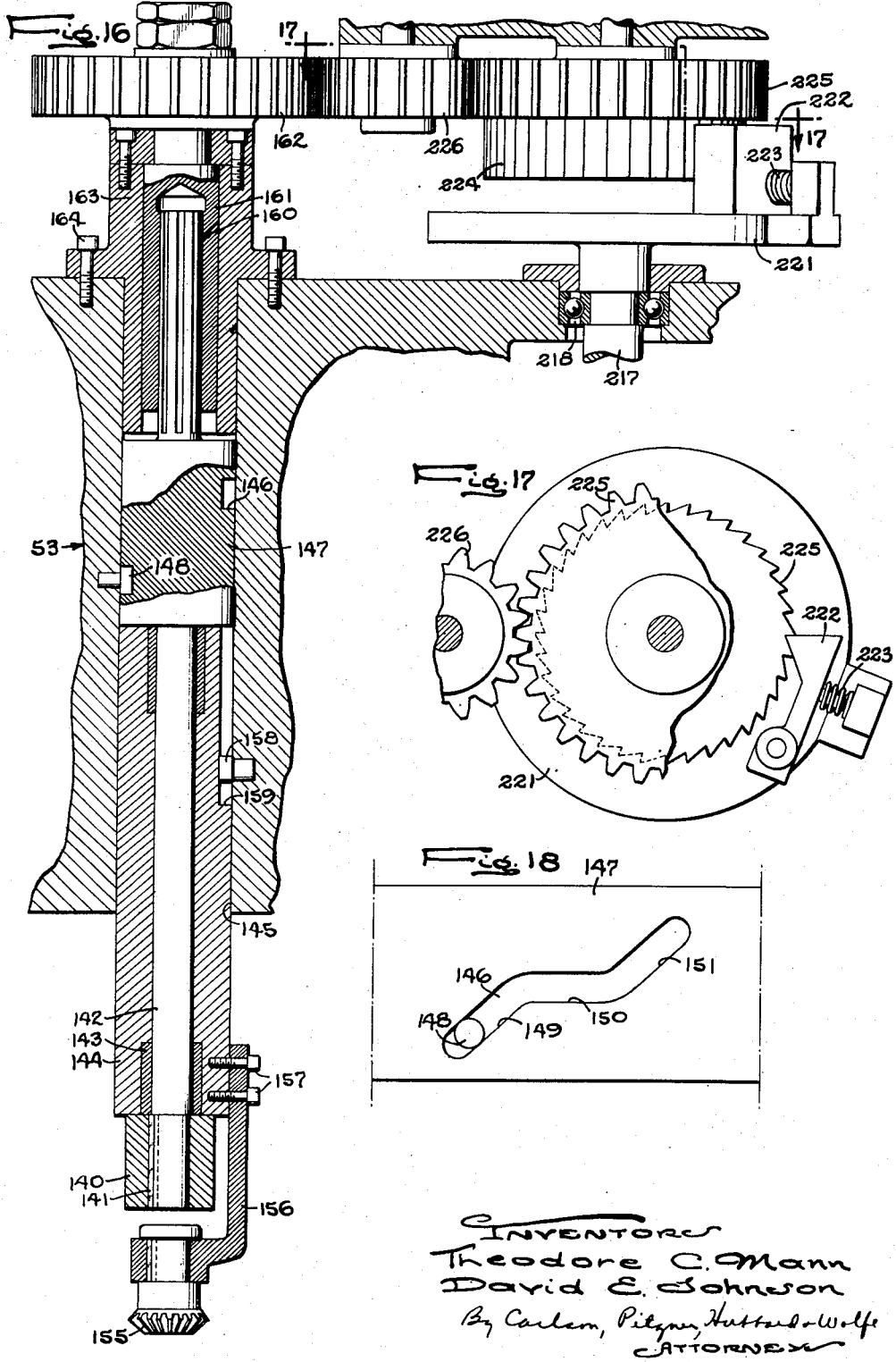

April 20, 1954
T. C. MANN ET AL
2,675,837
BOARD REPAIRING MACHINE
Filed Jan. 21, 1950
15 Sheets-Sheet 9
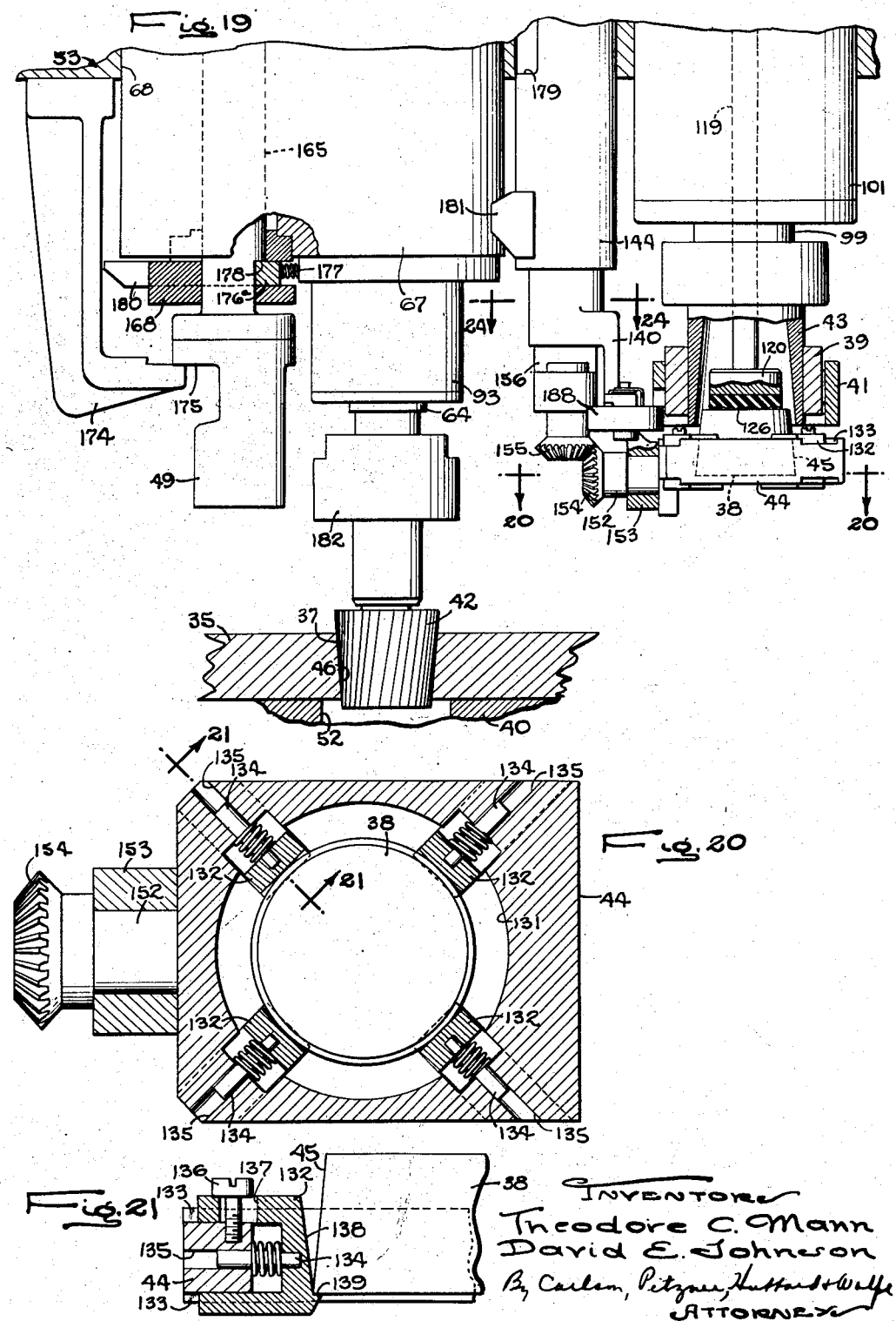
INVENTORS
Theodore C. Mann
David E. Johnson
By Carlsen, Pitzner, Hubbard & Wolfe
ATTORNEYS

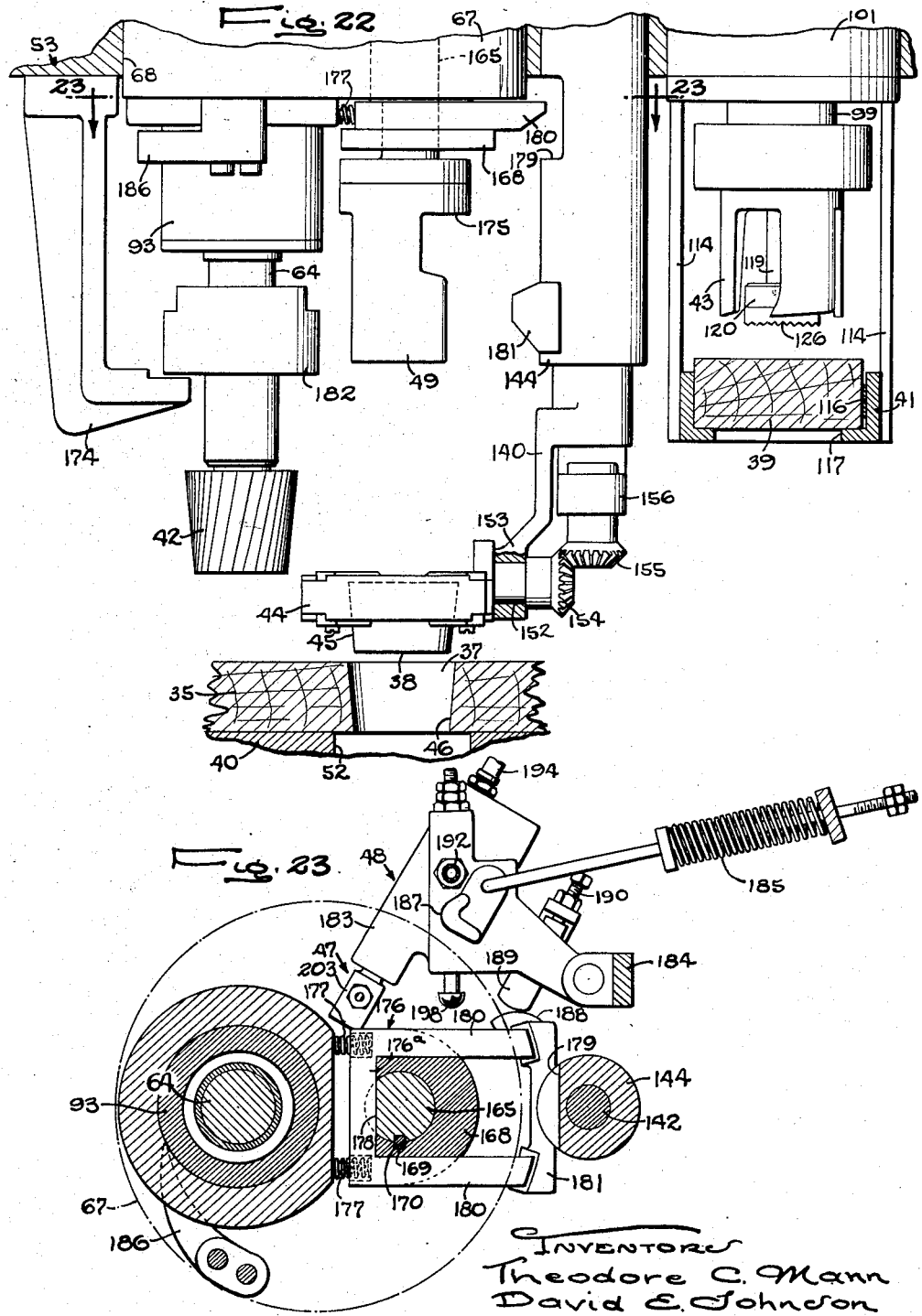

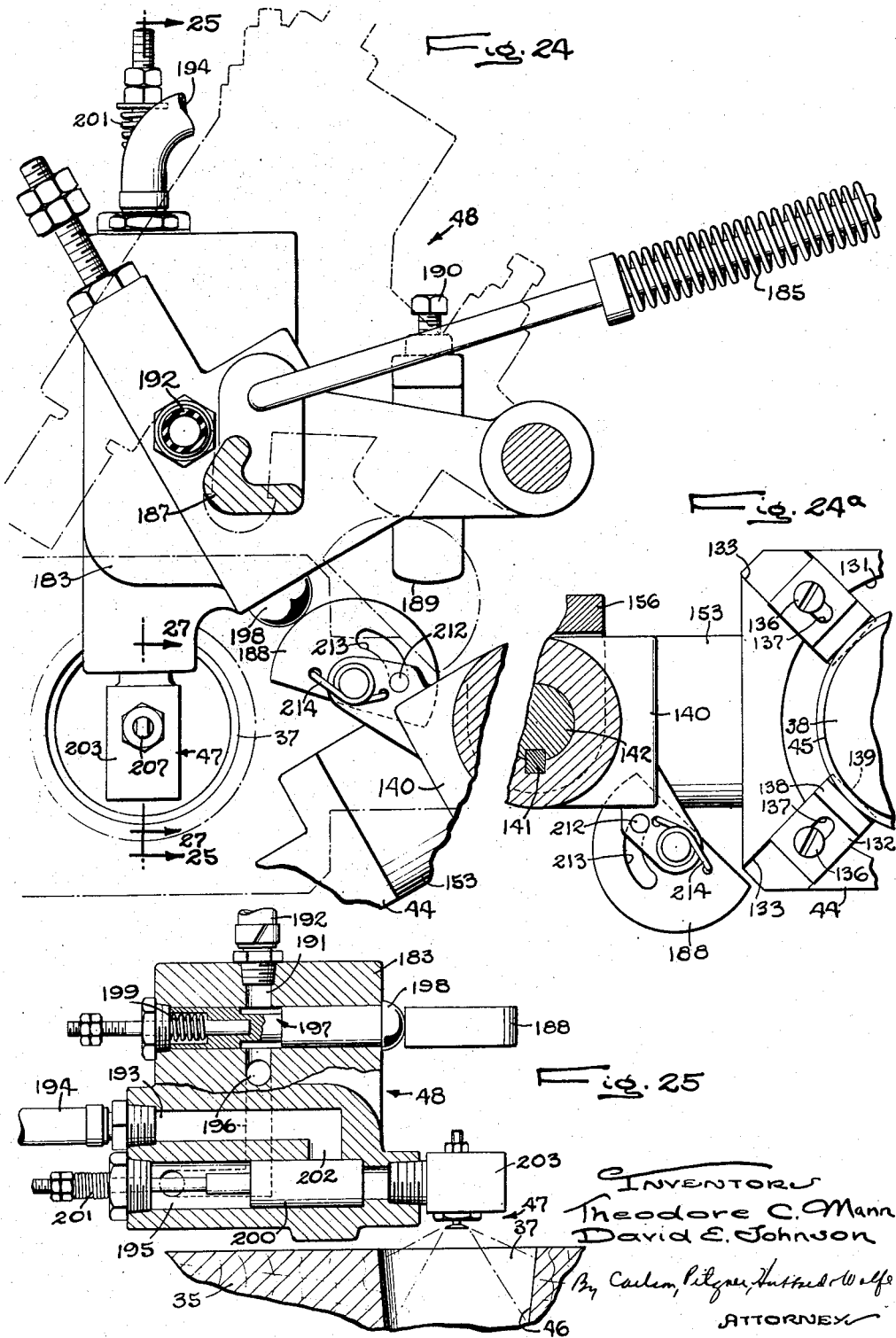

April 20, 1954 T. C. MANN ET AL 2,675,837
BOARD REPAIRING MACHINE
Filed Jan. 21, 1950 15 Sheets-Sheet 12
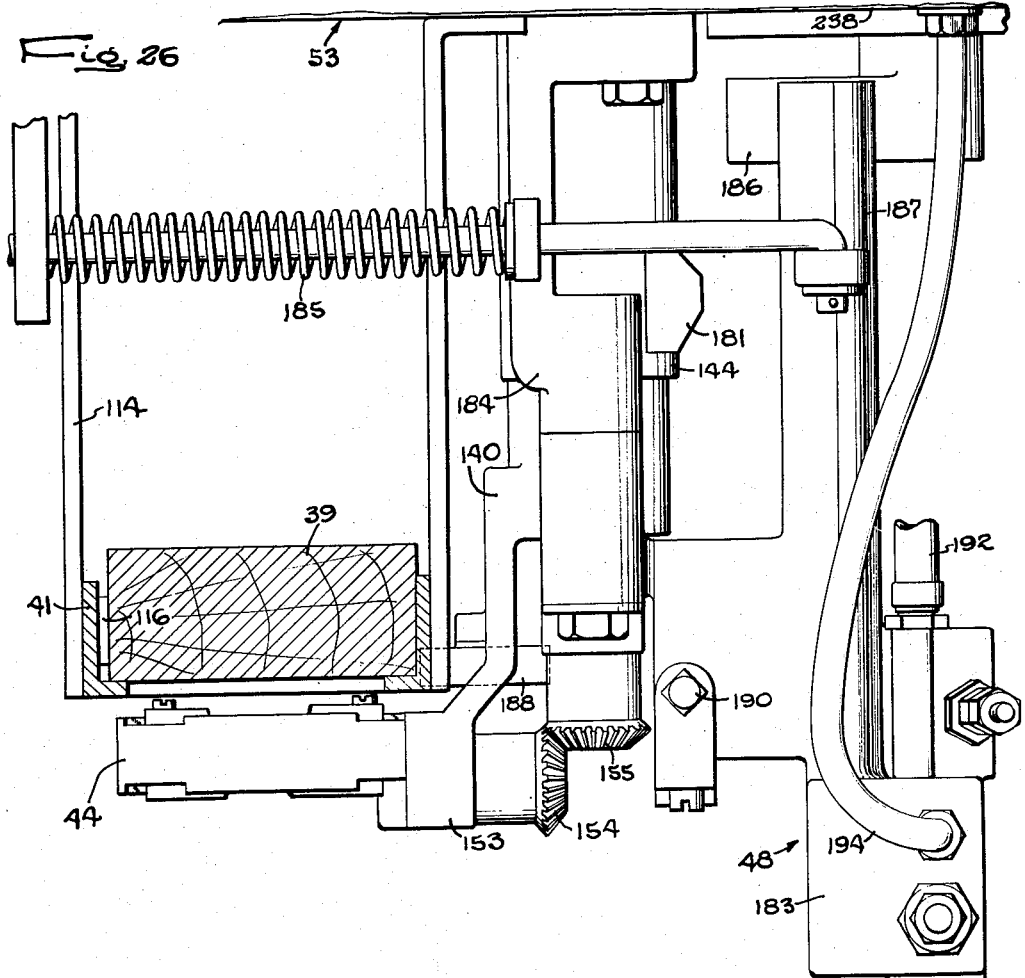
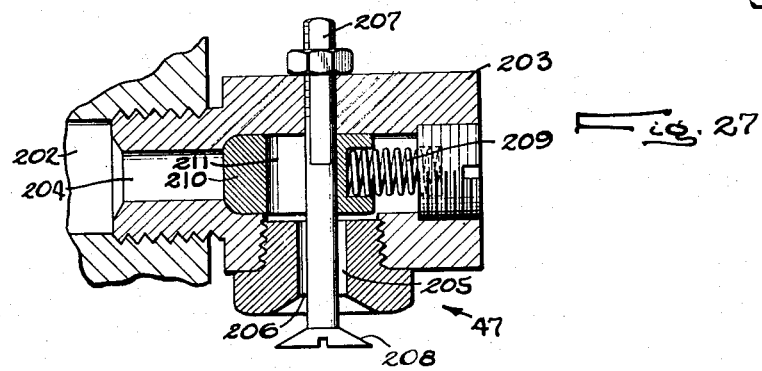

April 20, 1954  T. C. MANN ET AL  2,675,837
BOARD REPAIRING MACHINE
Filed Jan. 21, 1950  15 Sheets-Sheet 13
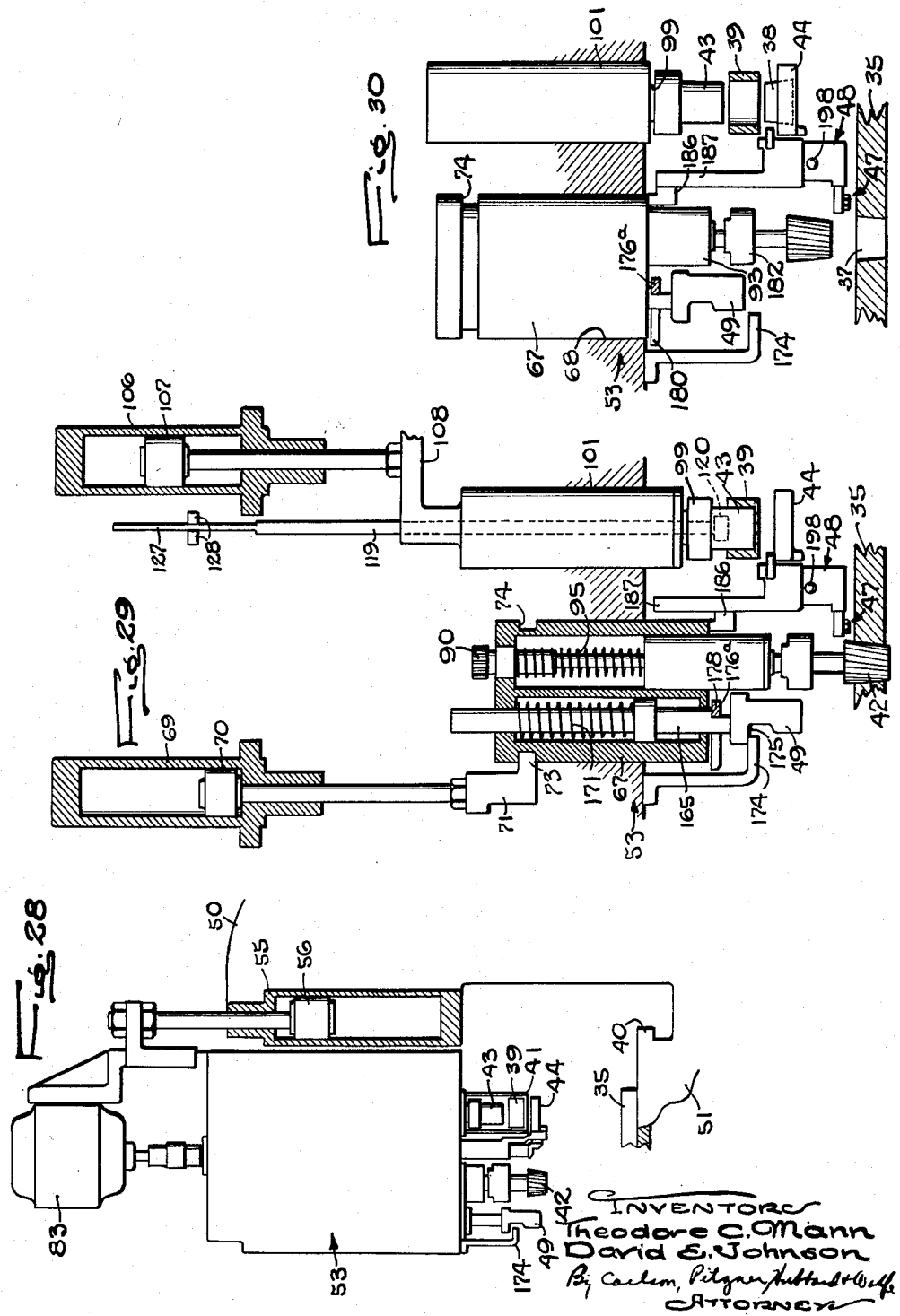

April 20, 1954     T. C. MANN ET AL     2,675,837
BOARD REPAIRING MACHINE
Filed Jan. 21, 1950     15 Sheets-Sheet 14
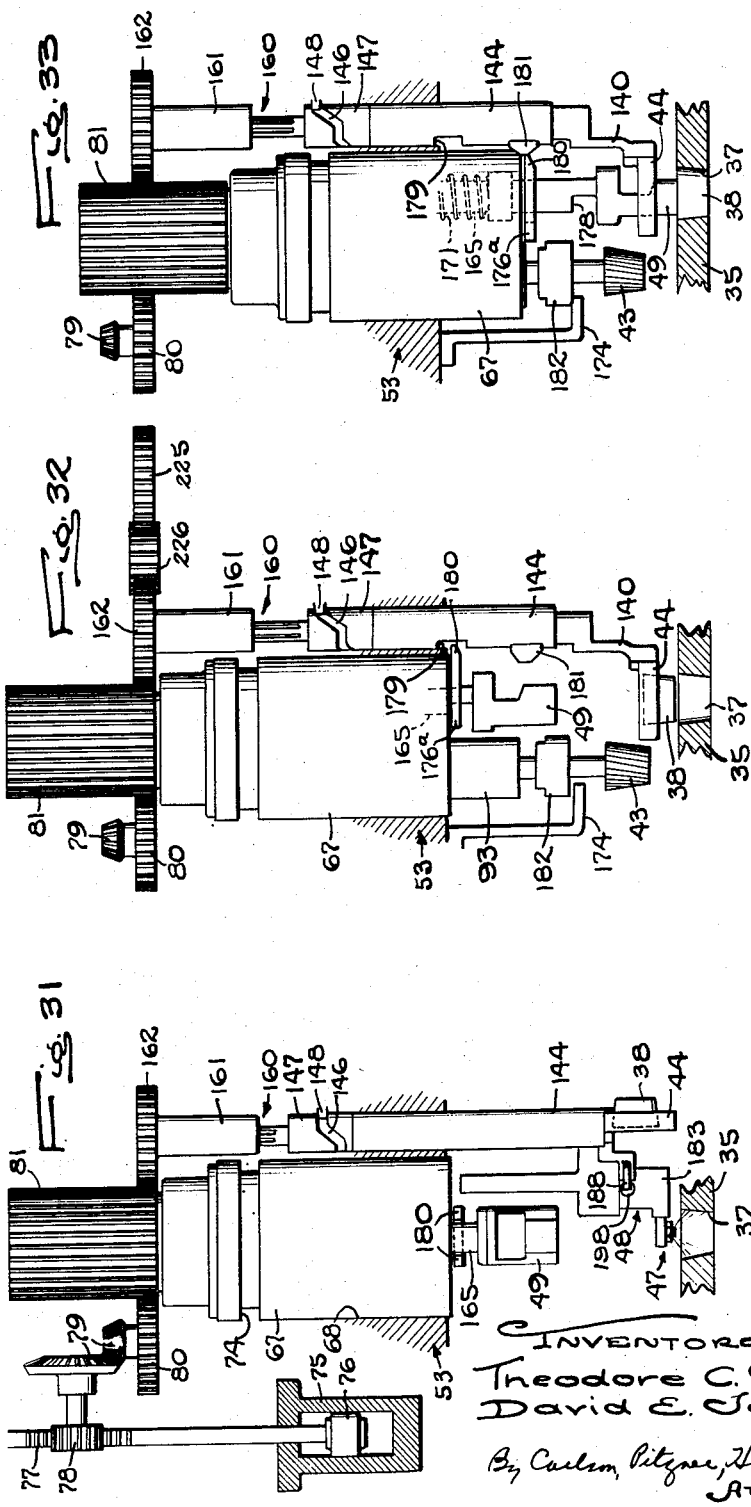

April 20, 1954 T. C. MANN ET AL 2,675,837
BOARD REPAIRING MACHINE
Filed Jan. 21, 1950 15 Sheets-Sheet 15

INVENTORS
Theodore C. Mann
David E. Johnson
By Carlson, Pitzner, Hubbard &Wolfe
ATTORNEYS

UNITED STATES PATENT OFFICE 2,675,837

BOARD REPAIRING MACHINE

Theodore C. Mann, Beloit, Wis., and David E. Johnson, Rockford, Ill., assignors to Ekstrom-Carlson & Co., Rockford, Ill., a corporation of Illinois Application January 21, 1950, Serial No. 139,884

15 Claims. (Cl. 144—2)

This invention relates generally to a machine for repairing a board having a defect therein such as a knot, a hole, or an indentation by forming a circular plug and inserting the same into a circular hole bored in the board for the purpose of removing the defect therefrom. The invention has more particular reference to machines of the type in which the plug is cut from a piece of plug stock in the form of a board and transferred laterally to a position over the hole in the board to be repaired for insertion in the latter.

The primary object of the present invention is to provide a machine of the above character in which the plug and the hole receiving the same are tapered so that the plug may be wedged in the hole with a tighter fit than has heretofore been possible.

Another object is to provide an automatic machine for cutting the plug and the hole simultaneously and then bringing the two into axial alinement for insertion of the plug in the hole.

A further object is to mount the hole cutter and mechanism for inserting the plug in the hole on an indexable carriage, the indexing motion of which is utilized in a novel manner to transfer the plug into a position to be inserted in the hole.

Still another object is to provide for cutting the plug out of a piece of grained board and inserting the plug in the hole in the board to be repaired with the grain of the latter and the plug alined.

A more detailed object is to achieve alinement of the grain of the plug and the board by engaging one end face of the plug as the same is being cut so as to retain positive control over the plug during its alinement with the hole.

A further object is to provide for applying glue to the wall of the freshly cut hole and actuating the glue applicator in a novel manner.

The invention also resides in the novel manner of deriving energy to actuate the plug inserting mechanism and in the novel mechanism for transferring the plug into alinement with the hole.

Other objects and advantages of the invention will become apparent from the following detailed description taken in connection with the accompanying drawings, in which:

Figure 1 is a fragmentary front elevation of a board repairing machine embodying the novel features of the present invention.

Fig. 2 is a fragmentary perspective view of a board having a defect therein.

Fig. 3 is a view similar to Fig. 2 showing the board repaired.

Figure 34:
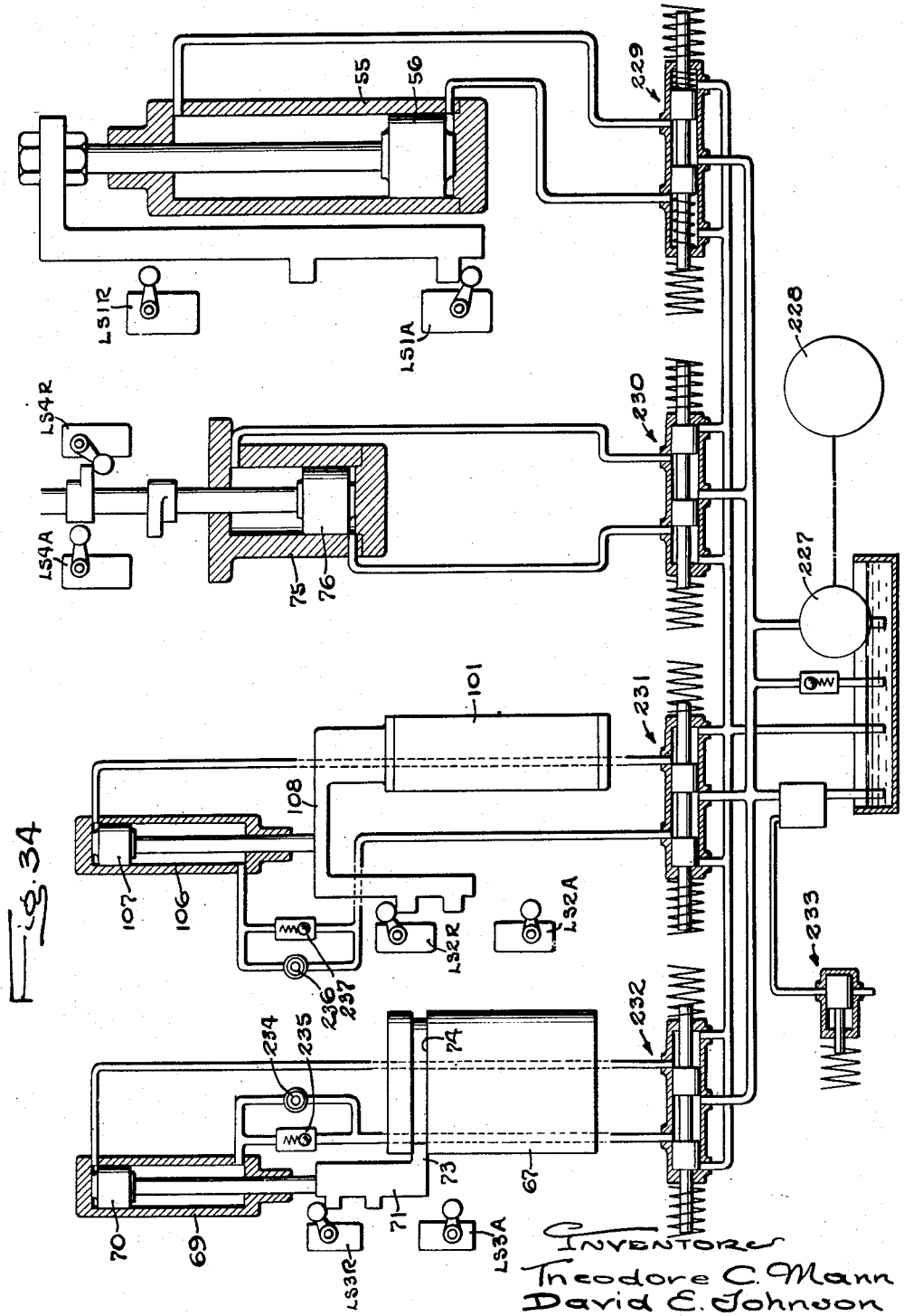

Figs. 4, 5, and 6 are schematic views showing different positions of a plug during its movement from a piece of plug stock to a position in alinement with a hole in a board to be repaired.

Fig. 7 is a fragmentary side elevation of the board repairing machine with a supporting column thereof broken away.

Fig. 8 is a plan view.

Fig. 9 is a fragmentary vertical sectional view taken along the line 9—9 of Fig. 1.

Fig. 10 is a fragmentary vertical section taken along the line 10—10 of Fig. 9.

Fig. 11 is a fragmentary horizontal section taken along the line 11—11 of Fig. 10.

Figs. 12 and 13 are fragmentary sectional views taken along the line 12—12 of Fig. 10 and showing the parts in different positions.

Fig. 14 is a fragmentary vertical section taken along the line 14—14 of Fig. 11.

Fig. 15 is a fragmentary sectional view taken along the line 15—15 of Fig. 14.

Fig. 16 is a fragmentary sectional view taken along the line 16—16 of Fig. 11.

Fig. 17 is a fragmentary section taken along the line 17—17 of Fig. 16 with one of the parts broken away.

Fig. 18 is a development of a barrel cam for lowering the plug holding mechanism.

Fig. 19 is an enlarged view similar to Fig. 9 showing both the plug and hole cutters advanced.

Fig. 20 is a horizontal section taken along the line 20—20 of Fig. 19.

Fig. 21 is a fragmentary sectional view taken along the line 21—21 of Fig. 20.

Fig. 22 is a view similar to Fig. 9 with the parts in different positions.

Fig. 23 is a sectional view taken along the line 23—23 of Fig. 22.

Fig. 24 is an enlarged fragmentary plan view of the glue applicator.

Fig. 24ᵃ is a detailed fragmentary plan view of the actuating cam for the glue applicator.

Fig. 25 is a vertical section taken along the line 25—25 of Fig. 24.

Fig. 26 is a fragmentary side elevation taken along the line 26—26 of Fig. 1.

Fig. 27 is a sectional view taken along the line 27—27 of Fig. 24.

Figs. 28 to 33 are diagrammatic views showing different steps in the operation of the machine.

Fig. 34 is a hydraulic circuit and electric switch diagram of the machine.

For purposes of illustration, the invention is shown in the drawings incorporated in a machine adapted to operate on a board or workpiece 35 having a defect 36 therein, such as a knot, an indentation, or the like (see Fig. 2), and repair the same by enlarging the defect to form a hole 37 (see Fig. 3) having a predetermined internal circular contour into which a correspondingly shaped plug 38 is inserted. While it is contemplated that the hole may be cut in the board in a separate machine, it is preferred to accomplish this in the same machine in which the plug is cut and preferably at the same time so that it is necessary to position the board only once both to cut the hole and position the plug therein. It is to be understood, however, that I do not intend to limit the invention to the specific form disclosed, but intend to cover all modifications and alternative constructions falling within the spirit and scope of the invention as expressed in the appended claims.

In the exemplary board repairing machine shown (see Figs. 7 and 19), the defective workpiece 35 to be repaired and a piece 39 of plug stock from which the plug 38 is made are mounted on supports 40 and 41 toward which cutters 42 and 43 are fed to cut the hole 37 in the workpiece and simultaneously cut the plug 38 which is received in a holder 44. To enable the plug to be driven into the hole with a wedging action, the periphery 45 of the plug is tapered axially and the hole 37 is formed with a correspondingly tapered side wall 46. The hole cutter is transferred laterally out of the way and, at the same time, the plug holder with the plug therein is transferred laterally to present the plug in axial alinement with the hole (see Figs. 6 and 22). Because of its taper, the plug is inverted during its transfer laterally (see Fig. 5). During this transfer, a coating of glue is delivered from a nozzle 47 of a glue applicator 48 to the wall of the hole. Finally, with the plug thus inverted to extend the tapers of the plug and the hole in the same direction axially, a plug pusher 49 (see Figs. 6 and 22) is advanced to press the plug out of the holder and into the hole.

The frame of the machine comprises a post or column 50 (see Figs. 7 and 8) upstanding from a base 51 formed on its top surface as a generally horizontal table which constitutes the work support 40 and against which the defective board 35 is clamped during operations on the board. To permit the hole cutter 42 to advance through the board without hitting the table, the latter is formed with a circular recess 52 (Figs. 19 and 22) over which the defect is positioned when the board is clamped flat against the table.

The hole and plug cutters 42 and 43, the mechanisms for holding the plug 38 and transferring the same to the hole 37, the glue applicator 48, and the plug pusher 49 are in this instance, together with their actuators and the support 41 for the plug stock 39, all mounted on a common support or head 53 which in order to shorten the over-all cycle of the machine is slidable along vertical ways 54 on the column 50 for rapid approach and return movements relative to the table 40. Actuation of the head at this rapid rate is effected preferably by a hydraulic actuator (see Figs. 9 and 28) comprising a stationary cylinder 55 and a piston 56 therein whose rod is bolted to the head, the cylinder being secured as by brackets 57 to the column.

The motion of the head 53 toward the table 40 is utilized in this instance to clamp the defective board 35 against the table and the motion of the head away from the table is utilized to release the board. For this purpose, two clamping elements 58 and 59 (see Figs. 1 and 10) in the form of plungers are carried by the head and yieldably urged for movement downwardly with respect to the latter and into engagement with the top surface of the board. One plunger 58 is slidable in and guided by a vertically disposed cylinder 60 depending rigidly from the underside of the frame and positioned so that the plunger engages the board on one side of the defect while the other plunger 59 is slidable axially in a similarly mounted cylinder 61 positioned so that the plunger engages the board on the opposite side of the defect. Pins 62 on the cylinders are received in axially extending slots 63 in the plungers to limit movement of the latter downwardly with respect to the cylinders.

*Hole cutting mechanism*

In order to cut the hole 37 with its side wall 46 tapering axially, the hole cutter 42 (see Fig. 19) is formed with radially disposed teeth on its lower end surface and axially tapering teeth on its side surface. The cutter is fast on a spindle 64 (Fig. 9) disposed vertically and journaled in bearings 65 and 66 in a tool carriage or slide 67 which is supported in the head 53 for vertical reciprocating movement toward and away from the table to feed the cutter along the axis of the defect 36 and is adapted to move the cutter laterally across the table 40 and out of alinement with the hole to permit the insertion of the plug 38 into the latter. Herein, the slide is shaped generally as a solid cylinder slidable in and guided by the walls of a vertically disposed hollow cylinder 68 in the head, the walls of the hollow cylinder also providing a bearing so that, with the spindle mounted eccentrically in the slide on an axis parallel to the axis of rotation of the slide, the latter may be rotated to index the hole cutter angularly across the table and into and out of alinement with the defect.

In the present instance, the hole cutter slide 67 is reciprocated vertically by a hydraulic actuator. This actuator (see Figs. 10 and 29) comprises a cylinder 69 bolted to and movable with the head 53 and having a piston 70 therein whose rod is secured at its lower end to a yoke 71. The latter is slidable in vertical ways 72 (see Figs. 10 and 12) on the head and is formed with a flange 73 which is received in an annular groove 74 on the outside of the slide adjacent the upper end thereof to couple the yoke and the slide for axial movement together but permitting the slide to rotate with respect to the yoke.

Another hydraulic actuator is employed in the present instance to turn the slide 67 and index the hole cutter 42 laterally across the table 40. This actuator (see Figs. 10 and 11) comprises a vertically disposed cylinder 75 which is bolted to the head 53 and has a piston 76 therein whose rod is formed intermediate its ends with rack teeth 77. The latter mesh with the teeth on a pinion 78 coupled through bevel gears 79 to a spur gear 80 which meshes with an elongated gear 81 keyed to a sleeve 82 secured to the top of the hole cutter slide. Elongating the teeth of the gear 81 enables the latter to remain in mesh with the spur gear 80 while reciprocating with the hole cutter slide.

Rotation of the spindle 64 and the hole cutter 42 thereon is effected herein by an electric motor 83 bolted to the head 53 and coupled through a spur gear 84 to a long-hubbed sleeve gear 85 which is journaled in bearings 86 in the head and fixed against axial movement relative thereto by collars 87. The sleeve gear 85 is coupled to a shaft 88 journaled in the sleeve 82 on the hole cutter slide 67 and carrying at its lower end a spur gear 89 meshing with a gear 90 fast on the spindle, axial movement of the shaft relative to the sleeve being prevented by collars 91 on the shaft. To permit the shaft 88 and the hole cutter slide to reciprocate vertically with respect to the head while maintaining the driving connections between the motor and the spindle 64, the shaft and the sleeve gear 85 are joined together by means of a spline coupling 92 formed by external spline teeth on the upper end of the shaft and internal teeth in the gear. The shaft is concentric with the hole cutter slide so that the latter may be rotated to index the hole cutter without breaking the coupling between the shaft and the spindle.

To enable the hole cutter 42 to yield axially with respect to the slide 67, the hole cutter spindle 64 is formed by two telescoping pieces 64$^a$ and 64$^b$ (see Fig. 9), the upper one 64$^a$ of which is journaled in the bearings 66 in the slide and fixed against axial movement with respect thereto and the lower one 64$^b$ of which is journaled in the bearings 65 carried in a sleeve 93. The latter is axially slidable in a cylinder 94 in the slide and yieldably urged toward the work by a spring 95, bearing at its upper end against a shoulder on the slide and at its lower end against the lower spindle part which is axially fixed relative to its bearing sleeve. Rotary motion is transmitted from the upper part of the spindle to the lower part thereof by a spline coupling 96 joining the telescoping parts together. A pin 97 in the hole cutter slide engages the opposite ends of a longitudinally extending slot 98 in the axially movable spindle bearing sleeve to determine the extent of axial movement of the latter with respect to the slide.

*Plug cutting mechanism*

As contemplated by the present invention, the plug cutter 43 (see Figs. 4, 14, and 19) is adapted to cut the plug 38 from the piece 39 of plug stock so that the peripheral wall of the plug tapers axially to fit in the correspondingly tapered hole 37 cut by the hole cutter 42 in the board 35 being repaired. Herein, the piece of plug stock is horizontally disposed and plugs are cut therefrom by a trepanning type of cutter with the peripheral wall 45 of the plug tapering upwardly away from the horizontal plane of the defective board 35. The plug cutter is fast on the lower end of a vertically disposed spindle 99 journaled in bearings 100 in a sleeve 101 which is reciprocable in a vertical cylinder 102 disposed in the head 53 and laterally spaced from the axis of the hole cutter slide 67. Relative axial movement between the plug cutter sleeve 101 and the spindle is prevented by a suitable collar 103 on the latter. The extent of vertical movement of the plug cutter sleeve with respect to the head is determined by a pin 104 and a slot 105 disposed respectively in the sleeve and the head.

Reciprocation of the plug cutter sleeve 101 to feed and return the plug cutter relative to the plug stock is effected herein by a hydraulic actuator. The latter comprises a cylinder 106 secured to the head 53 and a piston 107 therein whose rod is bolted to a bracket 108 secured as by bolts 109 to the top of the sleeve.

To rotate the plug cutter spindle 99, the motor 83 is coupled through the spur gear 84 to a long-hubbed sleeve gear 110 the hubs of which are journaled in bearings 111 in the head 53 and which is secured by collars 112 against axial movement with respect to the head. A spline coupling 113 formed by internal spline teeth in the sleeve gear and external teeth on the upper portion of the spindle couples the latter and the long-hubbed gear 110 together for rotation while permitting the spindle to reciprocate axially relative to the gear.

The piece 39 of plug stock is properly positioned under the plug cutter spindle 99 and above the table 40 in the plug stock support 41 which is secured as by brackets 114 to the lower part of the head. Herein, the plug stock support (see Figs. 9 and 14) is a channel bar receiving the plug stock between two upstanding flanges 115 one of which carries leaf springs 116 to bear against the plug stock and retain the same frictionally in the support Positioned below a hole 117 in the plug stock support and axially alined with the plug cutter spindle 99 is the plug holder 44 which is horizontally disposed and receives each plug after it is cut from the plug stock by the plug cutter. To facilitate insertion of a freshly cut plug into the holder, the hole cutter spindle is formed with an axial bore 118 to receive the shaft 119 of an axially movable plunger 120 which engages a portion of the plug stock forming one end face of the plug 38 being cut and yieldably urges the plug downwardly beyond the lower end of the plug cutter and into the holder. While the plunger may be actuated in various ways, it is preferred, for the sake of simplicity, to employ a compression spring 121 which bears at one end against a shoulder 122 defining the upper end of an enlarged portion 123 of the bore and at its other end against a collar 124 secured to the plunger shaft 119. Bearings 125 in the lower end of the spindle receive the lower end portion of the plunger shaft and center the same with respect to the plug cutter.

For a purpose to appear later, provision is made to insure that plugs cut by the cutter 43 will be received in the holder 44 with the grain of the plugs extending in a direction parallel to the grain of the plug stock. To this end, the plunger 120 is secured against rotation with respect to the plug cutter and the plug engaging or lower end surface 126 of the plunger is roughened to grip the top surface of each plug frictionally and prevent rotation of the latter with the cutter. Herein this is accomplished by flattening the upper end portion 127 of the plunger shaft 119 (see Figs. 14 and 15) and extending the same upwardly beyond the plug cutter spindle 99 and in between the forked ends 128 of a bracket 129. The latter is secured as by screws 130 to the head 53 with the forked ends of the bracket snugly receiving the upper end portion of the shaft. With this arrangement, the plunger shaft is free to slide axially under the action of the spring 121 within the plug cutter spindle but is secured against rotation relative thereto.

*Plug transferring mechanism*

Mechanism is provided to support the plug holder 44 under the plug cutter 43 while the plug 38 is being inserted therein by the plunger 120 and to transfer the holder laterally from the plug cutter to a position in which the plug is axially alined with the hole 37 in the board 35 being repaired. During its transfer laterally (see Figs. 4, 5, and 6), the plug is inverted so that the sides thereof which converged upwardly while being cut converge downwardly toward the table 40 when positioned in axial alinement with the hole. In addition, the holder, to enable the same to be inverted, is spaced a substantial distance above the table and is lowered during its lateral transfer so that the plug is spaced only a short distance above the hole 37 after the transfer is completed and preparatory to inserting the plug into the hole.

The plug holder 44 (see Figs. 19, 20, and 21) is shaped as a generally rectangular box having a circular central hole 131 therein larger than the plug and a plug engaging member 132 yieldably urged radially into the hole from each of the four corners of the holder. Each plug engaging member is guided in its radial movement by grooves 133 on the upper and lower surfaces of the holder and a radially extending pin 134 pressed into the member and slidably received in radial holes 135 in the holder. The extent of inward movement of each member is determined by a screw 136 on the holder and a slot 137 in the upper portion of the member. To facilitate entry of a plug into the holder, inwardly facing plug engaging surfaces 138 of the members diverge upwardly away from each other when the holder is disposed under the plug cutter 43. Shoulders 139 on the members limit the extent of entry of a plug into one side of the holder and prevent the entry of plugs into the holder from the other side thereof.

In the present embodiment of the invention, the plug holder 44 is mounted to transfer the plug 38 therein laterally across the table 40, invert the plug, and lower the same all as an incident to the indexing motion of the hole cutter slide 67. To transfer the plug laterally from the plug stock into alinement with the hole, the holder is mounted on an arm 140 (see Figs. 9 and 16) keyed as at 141 to the lower end of a spindle 142 which is rotatable with the hole cutter slide and journaled in bearings 143 in a sleeve 144 mounted in a vertically disposed cylinder 145 in the head. Upon rotation of the spindle, the holder is swung about the axis thereof and angularly across the table.

Lowering of the plug holder during rotation of the plug holder spindle 142 is effected by the cooperation between a barrel cam 146 (see Figs. 9, 16 and 18) formed as a peripheral groove on an enlargement 147 of the spindle and a follower 148 in the form of a pin projecting rigidly into the groove from the wall of the cylinder 145. With the holder positioned under the plug cutter 43 the follower is positioned on an inclined surface 149 of the cam. Upon rotation of the spindle 142 from this position to swing the holder angularly across the table, the follower moves first along the inclined surface 149 to lower the spindle and the holder, then along a flat horizontal dwell surface 150, and finally, along another inclined surface 151 to lower the holder still further and position the holder a short distance above the hole to be plugged.

To invert the plug holder during rotation of the plug holder spindle 142, a shaft 152 (see Figs. 19, 20, and 22) on the holder is journaled in the lower end 153 of the arm 140 with a beveled gear 154 fast on its outer end meshing with a nonrotatable beveled gear 155. The latter (see Fig. 16) is keyed to a bracket 156 secured as by bolts 157 to the sleeve 144 which is held against rotation with respect to the head by a pin 158 projecting rigidly from the wall of the cylinder 145 into an axially extending slot 159 in the plug holder sleeve 144. The arm 140 and the enlarged portion 147 of the spindle 142 hold the sleeve 144 against axial movement relative to the spindle so that the nonrotatable beveled gear 155 is lowered with the rotatable beveled gear 154 to provide continuous meshing of the two gears.

In the present instance, the plug transferring mechanism is actuated as an incident to indexing the hole cutter by coupling the hole cutter slide 67 to the plug holder spindle 142 so that the two rotate together. For this purpose, the spindle (see Figs. 9 and 16) at its upper end is spline coupled as indicated at 160 with the lower end portion of a hollow shaft 161. The latter carries a spur gear 162 at its upper end to mesh with the long gear 81 on the hole cutter slide. The hollow shaft is fixed against axial movement relative to the head but is journaled in a bearing 163 secured to the latter as by bolts 164, relative axial movement between the shaft and the spindle being permitted by the spline coupling joining the two.

Provision is made to insure that the grain of the plug 38 cut by the plug cutter 43 and the grain of the board 35 being repaired are always parallel to each other after the plug has been positioned by the plug transfer mechanism in axial alinement with the hole 37 to be plugged. Such relation of the grain of the plug and the grain of the board is accomplished by utilizing the nonrotating plunger 126 to position each plug in the plug holder as described above so that the grain of the plug is parallel to the grain of the plug stock and by supporting the piece of plug stock and a board being repaired so that the angular relation between the grain of the board and the grain of the stock is correlated with the angle through which the plug holder 44 moves about the spindle 142 in its transfer movement from the plug cutter to a position over the hole to be plugged.

In the present instance, the board 35 being repaired and the piece 39 of plug stock are laterally spaced apart in spaced parallel planes (see Fig. 1) with the plug stock disposed in a horizontal plane above the table 40. For simplicity (see Fig. 9), the axes of rotation of the plug cutter spindle 99, the hole cutter slide 67, and the plug holder spindle 142 are parallel and disposed in a vertical plane which is perpendicular to the plug stock and board being repaired. With this arrangement, the plug holder is swung through 180 degrees or a half revolution about the axis of the plug holder spindle 142 and rotated through a half revolution about the axis of the shaft 152 on the holder when the hole cutter slide 67 is indexed angularly through a half revolution about its axis.

Plug inserting mechanism

The plug pusher 49 (see Fig. 9) is in the form of a generally cylindrical block adapted to engage the plug 38 and push the same out of the holder 44 and into the hole 37 when the plug is positioned in the plug holder in axial alinement with the hole. To enable the pusher to be positioned in axial alignment with the hole as an incident to moving the hole cutter 42 out of alinement with the hole, the pusher is secured to the lower end of a rod 165 which is axially slidable in a vertical cylinder 166 formed in the hole cutter slide 67 and angularly spaced 180 degrees from the hole cutter spindle 64 (see Figs. 12 and 13). With this arrangement, when the hole cutter slide is rotated through a half revolution to move the hole cutter out of alinement with the hole, the plug pusher is automatically alined axially with the hole.

Herein, a sleeve 167 projecting into the upper end of the cylinder 166 slidably receives the upper portion of the pusher rod and centers the same in the cylinder while a centering block 168, which is secured as by bolts to the bottom of the sleeve, is apertured to receive and guide an intermediate portion of the rod. To prevent relative rotation between the rod and the hole cutter slide, a groove 169 (see Figs. 9 and 23) in the centering block receives an axially extending key 170 in the rod.

Energy derived from the downward movement of the hole cutter slide 67 in feeding the hole cutter 42 is utilized to actuate the plug pusher 49 after the latter is indexed to a position in alinement with the plug so that it is unnecessary to provide a separate power actuator for the pusher. In this instance, the energy is stored in a spring 171 surrounding the pusher rod 165 and the centering sleeve 167 and bearing at its upper end against a shoulder 172 adjacent the top of the plug pusher cylinder 166 and at its lower end against a collar 173 secured to the rod. The spring urges the latter downwardly, this movement being limited by engagement of the collar with the top of the centering block 168.

To store energy in the spring 171 during feeding of the hole cutter 42, an L-shaped stop 174 secured as by bolts to the head 53 is positioned to engage a shoulder 175 on the pusher and retain the latter at a predetermined distance above the table 40 during feeding of the cutter so as to urge the rod 165 upwardly with respect to the hole cutter slide 67 and compress the spring. When the slide reaches its lowest position, the closed end 176ª of a generally U-shaped latch bar 176 is urged by springs 177 (see Figs. 19 and 23) into a transverse notch 178 in the rod. The latch bar is slidable horizontally in the centering block 168 with arms 180 of the latch straddling the pusher rod. In the movement of the closed end of the latch bar into the notch the rod is locked in a position in which the spring 171 is compressed and the pusher is retained closely adjacent the bottom of the slide. The rod and the pusher thereon remain locked in this position during retraction and indexing of the slide, a transverse slot 179 in the plug holder sleeve 144 (see Figs. 22 and 32) permitting one of the legs 180 of the U-shaped latch to pass by the plug holder sleeve during such indexing.

Tripping the latch 176 to release the pusher 49 after the latter has been positioned over the hole 37 and axially alined therewith is effected by lowering the hole cutter slide 67 a second time to bring the legs 180 of the latch which are tapered at their ends to constitute follower surfaces into contact with a cam 181 secured to the plug holder sleeve 144. Upon engagement with the cam, the latch is moved transversely of the axis of the rod 165 to release the pusher. Upon such release, the latter is urged under the action of the spring 171 downwardly toward the plug 38 to push the same into the hole with a hammer blow action (see Fig. 33). In the downward movement of the slide, the stop 174 engages a collar 182 (see Fig. 22) fast on the hole cutter spindle 64 and pushes the latter against the action of the spring 95 to prevent the hole cutter from moving downwardly into the board being repaired.

Glue applying mechanism

After the hole 37 is cut in the board being repaired and before the plug 38 is inserted in the hole, the wall 46 of the latter is covered with glue dispensed from the glue applicator 48 which is moved into and out of a glue delivering position with respect to the hole wall and which is actuated automatically as an incident to movement of the hole cutter 42 out of alinement with the hole and the plug into alinement therewith. In the present instance, the applicator (see Figs. 23, 24, 25, 26, and 27) comprises a body 183 which is pivoted on a bracket 184 depending from the head and yieldably urged by a spring 185 to swing about a vertical axis in a plane parallel to the table and position the nozzle 47 of the applicator in axial alinement with the bored hole.

To swing the applicator away from the hole 37 when the hole cutter 42 is moved into axial alinement therewith, a cam 186 (see Figs. 23 and 26) secured to the bottom of the hole cutter slide 67 engages a follower arm 187 upstanding from the body 183 of the applicator and swings the latter about the bracket and against the force of the spring 185. When the hole cutter is indexed away from the hole, the body 183 swings back to position the nozzle 47 over the hole. The applicator is swung away from the hole to make room for the plug holder 44 and the plug pusher 49 by a cam 188 secured to the holder arm 140 and engaging a follower abutment 189 secured adjustably as by a bolt 190 to the applicator body, the cam disengaging the abutment when the holder is indexed back to the position under the plug cutter.

A port 191 in the applicator body 183 is connected by a flexible hose 192 to a suitable supply of air under pressure and another port 193 in the body is connected by a hose 194 to a suitable glue pot 238. The air port 191 communicates with one end of a cylinder 195 through a passage 196 adapted to be closed by a valve 197 which has an actuator 198 yieldably urged by a spring 199 into a valve closed position. The actuator is in the form of a pin slidable in the wall of the body and projecting outwardly therefrom. Within the cylinder 195 is a piston 200 which, when air is admitted to the cylinder, is urged against the action of a spring 201 in a direction to close a passage 202 connecting the glue port 193 with the nozzle 47 and to force glue from the passage into the nozzle.

The nozzle comprises a body 203 having an L-shaped passage with one leg 204 thereof communicating with the passage 202 in the body and another vertically disposed leg 205 terminating in a port 206 from which glue is discharged downwardly. To deflect the glue outwardly, a bolt 207 having a tapered surface 208 on the head thereof is centered within the passage with the head disposed below the port 206 so that the glue is directed first downwardly against the tapered surface and then outwardly against the wall 46 of the bored hole. Yieldably urged by a spring 209 to close the L-shaped passage and permit glue to be admitted to the nozzle only when the pin 198 is actuated is a piston 210 having a slot 211 therein through which the bolt 206 is extended.

To open the valve 197 and actuate the glue applicator, the pin 198 constitutes a follower positioned for engagement with the same cam 188 which engages the abutment 189 to move the glue applicator out of the way of the plug holder 44. The engagement between the cam 188 and the pin 198 occurs during the time that the plug holder follower 148 is engaging the horizontal dwell surface 150 of the barrel cam 146, the dwell surface insuring the proper positioning of the glue applying cam 188 with respect to the glue actuator pin 199. To permit the cam to swing past the actuator pin during the return indexing of the plug holder 44, the cam is pivotally mounted on the holder arm 140 and has a lost motion connection (see Fig. 24ᵃ) therewith provided by a pin 212 on the arm which is received in a slot 213 on the cam, the latter being urged by a spring 214 into the proper position to actuate the pin 199 (see Fig. 24).

Plug stock advancing mechanism

In the present instance, the plug stock 39 is advanced automatically as an incident to movement of the hole cutter slide 67 in moving the hole cutter out of alinement with the hole 37. For this purpose, a portion of one flange 115 of the plug stock support 41 is cut away to form an opening 215 therein to receive a plug stock advancing wheel 216 (see Figs. 11 and 14) which is positioned to engage the side surfaces of the plug stock. To grip the latter effectively, diametrically opposite portions of the periphery of the wheel are serrated with the intervening portions thereof cut away to provide clearance between the wheel and the plug stock when the wheel is stationary. A vertical shaft 217 supporting the wheel at its lower end is journaled in bearings 218 and 219 disposed respectively in the head and a sleeve 220 secured to the latter.

To turn the wheel 216 and advance the plug stock only during movement of the hole cutter slide 67 in one direction, the vertical shaft 217 (see Figs. 14, 16, and 17) is bolted at its upper end to a wheel 221 having a pawl 222 pivoted thereon and yieldably urged by a spring 223 into engagement with the teeth on a ratchet gear 224. The latter is rotatable with a spur gear 225 which is rotatably mounted in the head and driven through an idler gear 226 by the spur gear 162 of the plug transfer mechanism. When the hole cutter slide is turned in a counterclockwise direction as viewed in Fig. 11 to move the hole cutter away from the hole, the pawl engages the teeth of the ratchet gear to turn the shaft 217 and the plug stock advancing wheel so that the serrations of the latter engage the sides of the plug stock to advance the same. Upon rotation of the hole cutter slide in the opposite direction, the pawl 222 slips past the ratchet gear teeth and the advancing wheel 216 remains stationary.

The extent of the motions produced by the various hydraulic actuators above described may be positively limited by engagement of the pistons with the ends of the respective cylinders or by the provision of stops coacting with the movable parts. All actuators are supplied with pressure fluid from a pump 227 driven by a motor 228 through the circuits shown in Fig. 34 which are controlled by so-called four way valves 229, 230, 231, and 232 whose movable members are actuated by two associated actuating solenoids. A valve 233 vents the output of the pump at low pressure when an associated solenoid is energized and is closed to enable the pump to supply fluid under high pressure when the solenoid is deenergized. The movable member of the valve 229 is spring centered in a neutral position when the two associated actuating solenoids are deenergized. In each valve, when one solenoid is energized, the valve member is shifted to admit pressure fluid to one end of an associated hydraulic cylinder while connecting the other end to a drain line. When the other solenoid is energized, the valve reverses the connections between the cylinder ends and the drain and supply lines.

To cause the movable parts of the different mechanisms to operate in the proper sequence and thereby execute a desired automatic cycle during which the various operations are performed on a piece of plug stock and a board being repaired, the solenoid valves are arranged to be controlled by various limit switches shown in Fig. 34. These switches control the various energizing circuits through conductors which have been omitted for purposes of simplifying the disclosure and because the manner of interconnection of such switches and solenoids and the interlocking of the circuits to insure the desired sequence is well understood in the art.

Operation

Assuming that all of the various power actuated parts are in their retracted or idle positions, shown in Fig. 28, the cycle of operation proceeds as follows after the tool driving motor 83 and the pump motor 228 have been started. Let it further be assumed that the piece 39 of plug stock has been placed in the plug stock holder 41 under the plug cutter 43.

When the operator has placed the board 35 to be repaired on the table with the defect 36 therein positioned under the hole cutter 42, the cycle may be started by closing a push button or foot switch (not shown). As a result, a circuit conditioned by closure of various other switches when the parts are in their idle positions is completed to deenergize the solenoid of the vent valve 233 and enable the pump 227 to supply fluid to the system at high pressure. At the same time, a solenoid of the valve 229 is energized to admit fluid to the rod end of the cylinder 55, whereby to advance the head 53. This motion is terminated in response to actuation of a switch LS1A when the head reaches the proper position above the table 40. During such advance of the head, the clamping plungers 58 and 59 are brought into engagement with the board and yieldably urged downwardly to hold the board firmly against the table.

Upon actuation of the switch LS1A, the active solenoid of the valve 229 is deenergized permitting the movable element thereof to be centered and a solenoid of the valve 232 is momentarily energized to admit pressure to the head end of the cylinder 70 thereby initiating downward movement of the hole cutter slide 67 to feed the hole cutter 42 into the board 35. To achieve a slow rate of feed and rapid return of the hole cutter slide, a suitable needle valve 234 and a check valve 235 may be inserted in the fluid line connecting the rod end of the cylinder 70 and the valve 232.

With the hole cutter slide in the position in which the hole cutter and the hole are alined, the cam 186 engages the follower 187 on the glue applicator 48 to hold the latter away from the path of the hole cutter. During feeding of the hole cutter 43, the plug pusher 49 is engaged by the stop 174 and retained a predetermined distance to store energy in the spring 171. When the slide reaches its lower position (see Fig. 29), a switch LS3A is actuated. At this same time the latch 176 moves into the slot 178 in the rod 165 to lock the latter in an upper position with respect to the slide.

Simultaneously with the actuation of the valve 232 to feed the hole cutter, a solenoid of the valve 231 is momentarily energized to admit fluid to the head end of the cylinder 106 and initiate feeding of the plug cutter 43 into the plug stock 39. While the plug 38 is being cut, the plunger 120 holds the same against turning with the cutter and, as the plug is freed from the plug stock, the plunger pushes the plug into the holder 44. The latter, due to the action of the plunger, receives the plug with the grain thereof parallel to the grain of the plug stock. Upon completion of the plug cutting, a switch LS2A is actuated. A slow rate of feed and a rapid return of the plug cutter may be achieved by inserting a needle valve 236 and a check valve 237 in the fluid line connecting the rod end of the cylinder 106 with the valve 231.

The combined actuation of the switches LS2A and LS3A momentarily energizes the other solenoids of the valves 231 and 232 to reverse the positions of the movable elements therein. Such reversal of the valve 232 directs pressure fluid to the rod end of the cylinder 69 to elevate the hole cutter slide 67 and retract the hole cutter, the plug pusher 49 in this movement remaining locked in its upper position. By reversing the valve 231, pressure fluid is admitted to the rod end of the cylinder 106 to retract the plug cutter. Upon completion of the return movements of the plug cutter spindle 99 and the hole cutter slide (see Fig. 30), switches LS3R and LS2R are actuated.

Following actuation of the switches LS3R and LS2R, a solenoid of the valve 230 is momentarily energized to admit fluid to the head end of the indexing cylinder 75 and rotate the hole cutter slide through a half revolution. As an incident to such indexing, the plug stock advancing mechanism moves a new section of plug stock under the plug cutter and the plug holder 44 is transferred laterally across the table to position the plug 38 in axial alinement with the hole 37. The motions of the plug holder and the plug therein during such transfer include rotation through a half revolution about the vertical axis of the holder spindle 142, rotation through a half revolution about the horizontal axis of the shaft 152 on the holder, and lowering from a level just under the plane of the plug stock to a level just above the plane of the board being repaired, such motions being effected by the plug transferring mechanism above described including the beveled gears 154 and 155 and the barrel cam 146 and its follower 148. Because the nonrotating plunger 120 prevents rotation of the plug with the plug cutter and because the relative positions of the board and the plug stock are correlated with the angles through which the plug is moved, the grain of the plug will be parallel to the grain of the board when the plug is positioned in axial alinement with the hole.

Rotation of the hole cutter slide 67 through the first portion of its indexing movement causes the cam 186 on the sleeve to disengage the follower 187 on the glue applicator 48 and permit the latter to swing laterally to position the nozzle 47 over the hole 37 and the actuator pin 198 for the valve 197 for engagement with the cam 188 on the plug holder. Such engagement occurs approximately midway through the transfer movement of the plug holder (see Fig. 31) when the follower 148 is moving along the dwell surface 150 of the cam 146. Following actuation of the glue applicator by the cam 188, the latter continues to move with the plug holder and into engagement with the abutment 189 on the applicator body 183 to move the nozzle out of alinement with the hole and the applicator out of the way of the holder and the plug pusher.

Upon completion of the rotation of the hole cutter slide through a half revolution, a switch LS4A is actuated, the hole cutter then being positioned over the stop 174 and the plug and the plug pusher being axially alined (see Fig. 32). Actuation of the switch LS4A momentarily energizes one of the solenoids of the valve 232 to lower the hole cutter slide and feed the plug pusher. As the slide is being lowered, the hole cutter engages the stop 174 and is urged upwardly with respect to the slide against the action of the spring 95. Also, the pusher moves downwardly with the slide until the cam 181 engages the arms 180 of the latch 176. At this time (see Fig. 33), the latch is tripped permitting the pusher to move downwardly under the force of the spring 171 into engagement with the plug to push the same out of the holder and into the hole 37.

After the plug is positioned in the hole 37, the switch LS3A is actuated to energize the other solenoid of the valve 232 momentarily for admitting fluid to the rod end of the cylinder 69 and raising the hole cutter slide, the switch LS3R being actuated when this motion is completed. Actuation of the switch LS3R at this point in the cycle momentarily energizes the other solenoid of the valve 230 to admit fluid to the rod end of the indexing cylinder 75 and effect the return indexing movement of the hole cutter slide. The plug holder in this movement is re-inverted, raised, and transferred laterally back to the position under the plug stock and the glue applicator is moved by the cam 186 back into its original position. When the hole cutter slide reaches its original position in the head, a switch LS4R is actuated to energize the other solenoid of the valve 229 to admit fluid to the head end of the cylinder 59 and retract the head. At the completion of this motion, the various mechanisms are in their starting or idle positions and a switch LS1R is actuated to deenergize the active solenoid of the valve 229 and energize the solenoid of the vent valve 233. Actuation of the switch LS1R also prepares a circuit for initiation of the next cycle of the machine when the starting button is again depressed by the operator after the starting circuit has been prepared by completion of the necessary motions of the various mechanisms.

We claim as our invention:

1. In a board repairing machine, the combination of, means for supporting in spaced parallel planes and laterally spaced apart a board having a defect therein and a piece of plug stock in the form of a board with the grain of the plug stock and the grain of the board disposed in parallel relation, mechanism mounted for movement relative to said supporting means and toward and away from said defective board and operable to enlarge said defect and form a hole having a side wall tapering axially away from the plane of said plug stock, a plug holder positioned adjacent said plug stock and between said planes and rotatable about a first axis parallel to the planes, mechanism mounted for movement relative to said supporting means and toward and away from said plug stock and operable to cut from the latter and position in said holder a plug having a peripheral wall tapering axially away from the plane of said defective board with the grain of the plug and the grain of said defective board parallel to each other, mechanism connected to said plug holder for transferring the holder angularly through a half revolution about an axis normal to said planes to bring said plug and said hole into axial alinement with the grains of the plug and the defective board parallel, and mechanism connected to said holder and operable during the transfer of said plug angularly to move said holder away from the plane of said plug stock toward a position adjacent the plane of said defective board and to rotate said holder and the plug therein through a half revolution about said first axis to extend the tapers of the plug and the hole in the same direction when the two are alined axially 2. In a board repairing machine, the combination of, means for supporting a board having a defect therein and a board of plug stock in spaced parallel planes, mechanism mounted for movement relative to said supporting means and said defective board thereon and operable to enlarge said defect and form a hole having a side wall tapering axially and in one direction, a plug holder positioned adjacent said plug stock and between said planes and movable angularly about an axis parallel to the planes, mechanism mounted for movement relative to said supporting means and said plug stock thereon and operable to cut from the stock and position in said holder a plug having a peripheral wall tapering in a direction opposite to said first direction, mechanism connected to said plug holder for supporting and transferring the holder laterally away from said stock to bring said plug and said hole into axial alinement and for moving the holder away from the plane of said plug stock to a position adjacent the plane of said defective board, and mechanism connected to said holder and operable during transfer of the plug laterally for rotating said holder and the plug therein through a half revolution about said axis to extend the tapers of the plug and the hole in the same direction when the two are aligned axially.

3. In a board repairing machine, the combination of, means for supporting in spaced parallel planes a board having a defect therein and a piece of plug stock in the form of a board, mechanism mounted for movement relative to said defective board for enlarging said defect and forming a hole having a side wall tapering axially away from the plane of said plug stock, a plug holder positioned adjacent said plug stock and between said planes and movable angularly about an axis parallel to the planes, mechanism mounted for movement relative to said plug stock for cutting therefrom and positioning in said holder a plug having a peripheral wall tapering axially away from the plane of said defective board, mechanism connected to said plug holder for supporting and transferring the holder from its position adjacent said stock supporting means to bring said plug and said hole into axial alinement, and mechanism connected to said holder and operable during transfer of said plug to rotate said holder and the plug therein through a half revolution about said axis to extend the tapers of the plug and the hole in the same direction when the two are alined axially.

4. In a board repairing machine, the combination of, means for supporting in laterally spaced relation a board having a defect therein to be repaired and a board of plug stock, a hole cutter shaped to cut in said defective board a hole tapering axially in one direction, a plug cutter shaped to cut from said plug stock a plug with the peripheral wall thereof tapering in a direction opposite to said first direction, means mounting said hole cutter and said plug cutter respectively for movement axially through said defective board and said plug stock, and mechanism positioned to receive said plug as it is cut from said plug stock and operable to bring the plug and said hole into axial alinement with the side walls of the two tapering in the same direction, said mechanism including a spindle, means mounting said spindle for rotation about a fixed axis located between said plug stock and said board, a plug holder, a shaft projecting rigidly from said plug holder and journaled on said spindle for rotation about an axis extending transversely of the spindle axis, means for rotating said spindle to swing said holder in an arc about the axis of the spindle, a gear secured to the outer end of said shaft, and a second gear meshing with said first gear and held against rotation to effect rotation of said holder about the axis of said shaft as the holder is swung about the axis of said spindle.

5. In a board repairing machine, the combination of, means for supporting in spaced parallel planes and laterally spaced apart a board having a defect therein to be repaired and a piece of plug stock, a plug cutter, a hole cutter, means mounting said cutters for axial feeding movement through said board and said plug stock to cut a hole in the board to remove said defect therefrom and to cut from the plug stock a plug adapted to fit into said hole, a plug holder, means connected to said plug holder for supporting the holder in a position adjacent said plug stock for receiving said plug as the latter is freed from the plug stock, mechanism connected to said holder for transferring the holder laterally to bring said plug therein into axial alinement with said hole, a support for said transferring mechanism, a cam on said mechanism, and a follower on said support, said cam and follower coacting as an incident to lateral transfer of said plug to move said holder toward said board from said position adjacent said plug stock to position said plug closely adjacent said board preparatory to inserting the plug in said hole.

6. In a board repairing machine, the combination of, means for supporting a board having a defect therein to be repaired with the defect positioned on a predetermined axis normal to the board, a head, means mounting said head and said supporting means for relative approach and return movements longitudinally of said axis toward and away from each other, a slide mounted in said head for reciprocation relative thereto longitudinally of said predetermined axis and also for rotation about an axis parallel to and spaced from said first axis, a hole cutter journaled in said slide for rotation relative thereto about an axis spaced laterally from said slide axis, said hole cutter being shaped to cut a hole having a tapered side wall, a plug pusher slidable axially in said slide along an axis spaced from said hole cutter axis and said slide axis, means connected to said slide for turning the slide to bring said hole cutter axis or said pusher axis into alinement with said first axis, means spaced from said axis for supporting a piece of plug stock and cutting therefrom a plug having a tapering side wall, a plug holder positioned adjacent said stock for receiving said plug, mechanism connected to said holder for transferring the holder to bring said plug and said hole into axial alinement, and means connected to said slide and operable to move the slide axially to feed said cutter toward the board when the cutter and the defect are alined and for advancing said pusher to force said plug into said hole when the pusher, the plug, and the hole are alined.

7. In a board repairing machine, the combination of, means for supporting a board having a defect therein to be repaired with the defect positioned on a predetermined axis normal to the board, a slide, means mounting said slide for reciprocation longitudinally of said predetermined axis and also for rotation about an axis parallel to and spaced from said first axis, a hole cutter journaled in said slide for rotation relative thereto about an axis spaced laterally from said slide axis, said hole cutter being shaped to cut a hole having a tapered side wall, a plug pusher slidable axially in said slide along an axis spaced from said hole cutter axis and said slide axis, means connected to said slide for turning the slide to bring said hole cutter axis or said pusher axis into alinement with said first axis, means for supporting a piece of plug stock and cutting therefrom a plug having a tapering side wall, a plug holder for receiving said plug, mechanism connected to said holder for transferring the holder to bring said plug and said hole into axial alinement, and means connected to said slide for moving said slide axially to feed said cutter toward the board when the cutter and the defect are alined and for advancing said pusher to force said plug into said hole when the pusher, the plug, and the hole are alined.

8. In a board repairing machine, the combination of, a support adapted to receive a board having a defect therein to be repaired with the defect positioned on a predetermined axis normal to said support, a hole cutter for enlarging said defect to form a hole in said board alined with said axis, a plug pusher, a carriage supporting said cutter and said pusher in laterally spaced relation, mechanism mounting said carriage for feeding said cutter along said axis through said board and for movement across said support to bring the cutter or the pusher into alinement with said axis, said pusher being mounted in said carriage for limited movement longitudinally of said axis relative to the carriage, a spring urging said pusher toward said board, a stop fixed relative to said carriage and positioned to engage said pusher during movement of the carriage in feeding said cutter along said axis and move the pusher into the carriage against the action of said spring, coacting latch elements on said carriage and said pusher positioned to lock the latter in an inner position in which energy is stored in said spring, mechanism for supporting a plug and presenting the same in alinement with said predetermined axis in a position between said hole and said pusher when the latter is alined with said axis, and mechanism positioned to engage one of said latch elements for releasing said latch elements after said hole, said plug, and said pusher are alined to permit the latter to move under the action of said spring axially toward said board and push the plug into the hole.

9. In a board repairing machine, the combination of, a support adapted to receive a board having a defect therein to be repaired with the defect positioned on a predetermined axis normal to said support, a hole cutter for enlarging said defect to form a hole in said board alined with said axis, a plug pusher, a carriage supporting said cutter and said pusher in laterally spaced relation, mechanism mounting said carriage for feeding said cutter along said axis through said board and for movement across said support to bring the cutter or the pusher into alinement with the axis, said pusher being mounted in said carriage for limited movement longitudinally of said axis relative to the carriage, means yieldably urging said pusher outwardly toward said board, a stop fixed relative to said carriage and positioned to engage said pusher during movement of the carriage in feeding said cutter along said axis and move the pusher into the carriage against the action of said means, coacting latch elements on said carriage and said pusher positioned to lock the latter in a position in which the pusher has been pushed into the carriage against the action of said means, mechanism for supporting a plug and presenting the same in alinement with said axis in a position between said board and said pusher when the latter is disposed in alinement with the axis, and mechanism positioned to engage one of said latch elements for releasing said latch elements after said hole, said plug, and said pusher are alined to permit the latter to move under the action of said means along said axis toward said support and push the plug into the hole.

10. In a board repairing machine, the combination of, a support for a board having a defect therein to be repaired, a hole cutter shaped to enlarge said defect and form a hole in said board, means mounting said hole cutter for feeding the cutter through said board and for movement into and out of alinement with said defect, a plug holder for supporting a plug in a position spaced from said defect, mechanism for transferring said holder into a plug inserting position in which said hole and said plug are alined, a glue applicator for applying glue to the wall of said hole, means mounting said applicator for movement into and out of a position from which glue may be delivered to the wall of said hole, means yieldably urging said applicator into said glue delivering position and permitting movement thereof as an incident to movement of said cutter out of alinement with said hole, an actuator for said applicator positioned in the path of said holder for engagement by the latter during transfer thereof to actuate said applicator and deliver glue to the hole wall, and means positioning said applicator for engagement with said holder to move the applicator away from said glue applying position as an incident to movement of the holder into said plug inserting position after the holder has engaged said actuator.

11. In a board repairing machine having spaced hole forming and plug forming stations, the combination of, a support for holding a board having a defect therein to be repaired, a hole cutter shaped to cut an axially tapering hole, means located at said hole forming station and mounting said board support and said hole cutter for relative approach and return movements to advance said cutter through said board to enlarge said defect and form an axially tapering hole, a support for holding a piece of plug stock, a plug cutter shaped to cut a plug having an axially tapering peripheral wall and adapted to fit wedgingly in said hole, means located at said plug cutting station and mounting said plug cutter and said stock support for relative approach and return movements to advance the plug cutter through said stock and cut from the latter a tapered plug, a plug holder mounted for movement back and forth between a position in alinement with said plug cutter at said plug forming station and a position in alinement with said hole at said hole forming station, and mechanism connected to said holder and operable to move the holder away from said plug cutter and bring a plug therein into axial alinement with said hole with the side walls of the plug and the hole tapering in the same direction.

12. In a board repairing machine, the combination of, a support for holding a board having an axially tapered annular hole therein, a second support adapted to receive a piece of plug stock in the form of a board and spaced from said board support with the planes of the two supports disposed in a predetermined angular relation, a cutter movable toward said second support and through said plug stock to cut an axially tapered annular plug adapted to fit into said hole, a plug transfer mechanism movable back and forth relative to said board support between a plug-inserting position adjacent said board support and in alinement with said hole and a plug-receiving position adjacent said second support for receiving said plug, and a plug holder forming a part of said transfer mechanism and rotatable about an axis parallel to both of said planes and through an angle correlated with said angle between the planes to move a plug from a position parallel to said second support plane when the transfer mechanism is in said plug-receiving position to a position parallel to said board support plane when the transfer mechanism is in said plug-inserting position.

13. In a board repairing machine, the combination of, a support for a board having a defect therein to be repaired with the deflect disposed in alinement with a predetermined axis normal to the board, means disposed adjacent said board support and spaced from said axis for supporting a piece of plug stock with the grain of the latter and the grain of the board disposed in a predetermined angular relation, a hollow rotatable cutter positioned on one side of said plug stock, means mounting said cutter for movement through said plug stock to cut a generally circular plug therefrom, a plug holder positioned on the opposite side of said stock for receiving the plug as it is freed from the stock and holding the plug firmly against turning relative to the holder, an axially movable plunger within said cutter fixed against rotation with the cutter, means urging said plunger toward said holder to engage the plug being cut, said plunger having gripping means on its end engageable with said plug to hold the plug positively against turning with the cutter to maintain said predetermined angular relation between the grain of the plug and the grain of said board while forcing the plug into the holder as the plug is freed from said stock, and mechanism connected to said holder for supporting and transferring said holder and said plug therein relative to said board to position the axis of the plug in alinement with said predetermined axis with the grain of the plug parallel to the grain of said board.

14. In a board repairing machine, the combination of, means for supporting a board having a defect therein with the defect positioned on a predetermined axis normal to said board, a hole cutter shaped to enlarge said defect and form a hole in said board and mounted for feeding movement along said axis through said board and also for movement laterally into and out of alinement with the axis, a plug holder movable into and out of alinement with said axis, a plug pusher, means mounting said plug pusher for movement laterally into and out of alinement with said axis and for feeding movement along the axis toward said board supporting means, yieldable means acting between said pusher and said mounting means and urging the pusher toward an advanced position, a member engageable with said pusher during axial feeding of said hole cutter to move the pusher to a retracted position against the action of said yieldable means, a latch mechanism carried by said pusher and said mounting means and operable to hold the pusher in said retracted position, and a member engageable with said latch mechanism and operable to release the pusher to advance under the action of said yieldable means when said hole, said pusher, and said plug holder are alined along said axis.

15. In a board repairing machine, the combination of, means supporting in spaced relation a board having a defect therein to be repaired and a piece of plug stock, a hole cutter shaped to enlarge said defect and form a hole in said board, means mounting said hole cutter for feeding the cutter through said board and for moving the cutter into and out of alinement with said defect, a plug holder positioned adjacent said plug stock, mechanism mounted for movement relative to and toward and away from said plug stock for cutting a plug from said stock and positioning the same in said holder, mechanism connected to said holder for supporting and transferring said holder to bring said plug therein into axial alinement with said hole, a glue applicator for applying glue to the wall of said hole, means mounting said glue applicator for movement into and out of a position from which glue may be delivered to the wall of the hole, mechanism engageable with said applicator for moving said glue applicator into said glue delivering position automatically during movement of said hole cutter out of alinement with said hole, and an element movable with said holder during transfer of the latter into alinement with said hole and engageable with said applicator first to actuate the latter and deliver glue to said hole wall and then to move the applicator out of said glue delivering position.

References Cited in the file of this patent

UNITED STATES PATENTS

| Number | Name | Date |
| --- | --- | --- |
| 807,776 | Reisler | Dec. 19, 1905 |
| 1,838,426 | Maurer | Dec. 29, 1931 |
| 1,983,179 | Maurer | Dec. 4, 1934 |
| 2,091,450 | Miller | Aug. 31, 1937 |
| 2,336,704 | Skoog | Dec. 14, 1943 |